(12) United States Patent
Wang et al.

(10) Patent No.: US 10,636,297 B2
(45) Date of Patent: Apr. 28, 2020

(54) COOPERATIVE AUTONOMOUS DRIVING FOR TRAFFIC CONGESTION AVOIDANCE

(71) Applicant: Fujitsu Limited, Kawasaki-shi, Kanagawa (JP)

(72) Inventors: Nannan Wang, Plano, TX (US); Xi Wang, Murphy, TX (US); Qiong Zhang, Plano, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 1 day.

(21) Appl. No.: 15/988,151

(22) Filed: May 24, 2018

(65) Prior Publication Data
US 2019/0051159 A1    Feb. 14, 2019

Related U.S. Application Data

(60) Provisional application No. 62/544,336, filed on Aug. 11, 2017.

(51) Int. Cl.
*G08G 1/01* (2006.01)
*B60W 30/18* (2012.01)
(Continued)

(52) U.S. Cl.
CPC ..... *G08G 1/0145* (2013.01); *B60W 30/18009* (2013.01); *G05D 1/0027* (2013.01);
(Continued)

(58) Field of Classification Search
CPC ...... G08G 1/0145; G08G 1/22; G08G 1/0133; G08G 1/0112; H04W 4/46; G05D 1/0088;
(Continued)

(56) References Cited

U.S. PATENT DOCUMENTS 8,457,827 B1    6/2013   Ferguson et al.
2017/0050638 A1   2/2017   Gordon et al.
(Continued)

OTHER PUBLICATIONS

Guériau, Maxime, et al. "How to assess the benefits of connected vehicles? A simulation framework for the design of cooperative traffic management strategies." Transportation research part C: emerging technologies 67 (Mar. 11, 2016): 266-279; 14 pages.

(Continued)

*Primary Examiner* — Yuen Wong
(74) *Attorney, Agent, or Firm* — Baker Botts L.L.P.

(57) ABSTRACT

Systems and methods for traffic congestion avoidance may use cooperative autonomous driving based on vehicle-to-vehicle communication to resolve deadlock conditions. The method may include automatically detecting, by a given autonomous vehicle, that the given vehicle is deadlocked, initiating, by the given vehicle, formation of a coordination group including the given vehicle, a front vehicle traveling in the same driving lane as the given vehicle, and an assistant autonomous vehicle traveling in a lane adjacent to the lane in which the given vehicle and the front vehicle are traveling, and sending, by the given vehicle using vehicle-to-vehicle communication, a cooperative driving task request to initiate actions by the autonomous vehicles in the coordination group to resolve the deadlock condition. The actions may include modifying a driving plan of an autonomous vehicle in the coordination group and initiating a speed negotiation with an autonomous vehicle in the coordination group.

20 Claims, 17 Drawing Sheets

(51) Int. Cl.
  *G05D 1/00* (2006.01)
  *H04W 4/46* (2018.01)
  *G08G 1/00* (2006.01)
(52) U.S. Cl.
  CPC ......... *G05D 1/0088* (2013.01); *G08G 1/0112* (2013.01); *G08G 1/0133* (2013.01); *G08G 1/22* (2013.01); *H04W 4/46* (2018.02); *B60W 2550/302* (2013.01); *B60W 2550/306* (2013.01); *B60W 2550/408* (2013.01); *G05D 2201/0213* (2013.01)
(58) Field of Classification Search
  CPC ........ G05D 1/0027; G05D 2201/0213; B60W 30/18009; B60W 2550/408; B60W 2550/302; B60W 2550/306
  See application file for complete search history.

(56) References Cited

U.S. PATENT DOCUMENTS

2017/0192429 A1 7/2017 Tseng et al.
2017/0287331 A1* 10/2017 Laur ................ G08G 1/096791

OTHER PUBLICATIONS

Ajaykumar, Lakshmisha S Krishna. "Automated Lane Changing using Automated Vehicles with Disruption Minimization." International Journal of Advanced Research in Computer and Communication Engineering, vol. 5, Issue 6, Jun. 2016; 4 pages.
Alonso, Javier Diaz et al., "Lane-change decision aid system based on motion-driven vehicle tracking," *IEEE Transactions on Vehicular Technology*, vol. 57, No. 5, pp. 2736-2746, Sep. 5, 2008; 11 pages.
Al-Sultan, Saif et al., "A comprehensive survey on vehicular ad hoc network," *Journal of Network and Computer Applications*, vol. 37, pp. 380-392, Feb. 28, 2014; 13 pages.
Altché, Florent et al. "An Algorithm for Supervised Driving of Cooperative Semi-Autonomous Vehicles." IEEE Transactions on Intelligent Transportation Systems 18.12 (Jun. 25, 2017): 3527-3539; 15 pages.
Baber, Jonathan, et al. "Cooperative autonomous driving: intelligent vehicles sharing city roads." IEEE Robotics & Automation Magazine 12.1 (Mar. 2005): 44-49; 6 pages.
Bomey, Nathan, "Feds: Cars must be able to talk to each other." Retrieved from url: https://www.usatoday.com/story/money/cars/2016/12/13/self-driving-cars-vehicle-to-vehicle-technology-v-to-v-nhtsa-autonomous-cars-v2v/95367310/, Dec. 13, 2016; 2 pages.
C. Urmson and W. William, "Self-driving cars and the urban challenge," *IEEE Intelligent Systems*, vol. 23, No. 2, pp. 66-68, Mar. 2008; 3 pages.
Doniec, Arnaud, et al. "Traffic Simulation at Junction: Non-Normative Practices vs. Deadlock." Joint International Conference on Computing and Decision Making in Civil and Building Engineering, Jun. 14-16, 2006; 10 pages.
F. C. Chou, S. E. Shladover, and G. Bansal, "Coordinated merge control based on v2v communication," in Proceedings, IEEE Vehicular Networking Conference (VNC), Torino, Italy, 2016; 8 pages.
Fujitsu Limited, Vmware, Inc. "Fujitsu and VMware Expand their Strategic Collaboration to Offer IoT Solutions for the Automobile Industry." Retrieved from url: http://www.fujitsu.com/global/about/resources/news/press-releases/2017/0330-01.html. Mar. 30, 2017; 3 pages.
Gregoire, Jean et al. "Optimal cooperative motion planning for vehicles at intersections." arXiv preprint arXiv:1310.7729 (Oct. 29, 2013); 6 pages.
Hu, Jiajun, et al. "Scheduling of connected autonomous vehicles on highway lanes." Global Communications Conference (Globecom), 2012 IEEE. IEEE, 2012; 6 pages.
Kamal, M.A.S. et al., "Efficient vehicle driving on multi-lane roads using model predictive control under a connected vehicle environment," in *Proceedings, IEEE Intelligent Vehicles Symposium (IV)*, Seoul, Korea, Jun. 2015; 6 pages.
Kang, Cecilia, "Self-Driving Cars Gain Powerful Ally: The Government." Retrieved from url: https://www.nytimes.com/2016/09/20/technology/self-driving-cars-guidelines.html, Sep. 19, 2016; 5 pages.
Kesting, Arne et al., "General lane-changing model MOBIL for car-following models," *Transportation Research Record: Journal of the Transportation Research Board*, No. 1999, pp. 86-94, Jan. 2007; 9 pages.
Khan, Umer, et al. "Analyzing cooperative lane change models for connected vehicles." Connected Vehicles and Expo (ICCVE), 2014 International Conference on. IEEE, 2014; 6 pages.
M. Treiber, A. Hennecke, and D. Helbing, "Congested traffic states in empirical observations and microscopic simulations," *Physical review E*, vol. 62, No. 2, p. 1805, Aug. 30, 2000; 47 pages.
Morla, Ricardo. "Vision of congestion-free road traffic and cooperating objects." Sentient Future Competition (Nov. 2005); 8 pages.
National Highway Traffic Safety Administration, "Federal Automated Vehicles Policy: Accelerating the Next Revolution in Roadway Safety." Sep. 2016; 116 pages.
National Highway Traffic Safety Administration, "Federal Motor Vehicle Safety Standards; V2V Communications." Retrieved from url: https://www.federalregister.gov/documents/2017/01/12/2016-31059/federal-motor-vehicle-safety-standards-v2v-communications, Jan. 12, 2017; 166 pages.
Perronnet, Florent et al. "Vehicle routing through deadlock-free policy for cooperative traffic control in a network of intersections: Reservation and congestion." Intelligent Transportation Systems (ITSC), 2014 IEEE 17th International Conference on. IEEE, Oct. 8-11, 2014; 6 pages.
R. Bauza and J. Gozalvez, "Traffic congestion detection in large-scale scenarios using vehicle-to-vehicle communications," *Journal of Network and Computer Applications*, vol. 36, No. 5, pp. 1295-1307, Mar. 3, 2012; 13 pages.
Reghelin, Ricardoet al. "Optimizing coordinated motion planning for multiple car-like robots on a segment of highway." Robotica 34.10 (2016): 2274-2290; 17 pages.
Seeking Alpha, "How IBM is Silently Becoming an Autonomous Vehicle Leader." Retrieved from url: haps://seekingalpha.com/article/4064205-ibm-silently-becoming-autonomous-vehicle-leader, Apr. 21, 2017; 2 pages.
Shankland, Stephen "US to Push for Mandatory Car-to-car wireless communications." Retrieved from url: https://www.cnet.com/news/us-to-push-for-mandatory-car-to-car-wireless-communications/, Feb. 3, 2014; 4 pages.
V. A. van den Berg and E. T. Verhoef, "Autonomous cars and dynamic bottleneck congestion: The effects on capacity, value of time and preference heterogeneity," *Transportation Research Part B: Methodological*, vol. 94, pp. 43-60, Sep. 19, 2016; 18 pages.
V. Wagner, "Driving into the future: Autonomous cars," http://www.technewsworld.com/rsstory/74708.html, Mar. 27, 2012; 4 pages.
Vahidi, Ardalan et al., "Research advances in intelligent collision avoidance and adaptive cruise control," *IEEE Transactions on Intelligent Transportation Systems*, vol. 4, No. 3, pp. 143-153, Sep. 3, 2003; 11 pages.

* cited by examiner

COOPERATIVE AUTONOMOUS DRIVING FOR TRAFFIC CONGESTION AVOIDANCE

CROSS-REFERENCE TO RELATED APPLICATIONS

This application claims priority from U.S. Provisional Application No. 62/544,336 filed Aug. 11, 2017, entitled "COOPERATIVE AUTONOMOUS DRIVING FOR TRAFFIC CONGESTION AVOIDANCE THROUGH VEHICLE-TO-VEHICLE COMMUNICATIONS," which is incorporated herein by reference in its entirety for all purposes.

BACKGROUND

Field of the Disclosure

The present disclosure relates generally to control of autonomous vehicles and, more particularly, to systems and methods for cooperative autonomous driving for traffic congestion avoidance through vehicle-to-vehicle communications.

Description of the Related Art

Autonomous vehicles have been demonstrated and are beginning to be used in real world driving situations. For example, recently, several advanced technology companies have tested their autonomous vehicles on roads with real traffic. The developing technologies for autonomous vehicles may enable widespread use of autonomous vehicles on public roads in the near future. The intelligence used in autonomous vehicles may increase both road safety and fuel efficiency. For example, autonomous vehicles can detect surrounding conditions and can make early and wise decisions when taking actions to avoid traffic accidents. Furthermore, the fuel consumption of each autonomous vehicle can be reduced, as compared to vehicles being driven by a human driver, by tuning and optimizing the acceleration and deceleration profiles of the autonomous vehicles.

Meanwhile, traffic congestion, which leads to extra fuel costs and travel time, remains a challenging issue for autonomous vehicles. Some semi-autonomous vehicles today are equipped with features such as traffic jam assistance, which helps relieve some stress of human drivers when stuck in a traffic jam. Vehicles with more advanced autonomy can help reduce traffic congestion by allowing them travel closer together while operating at higher speeds. Existing autonomous vehicles rely on local intelligence to resolve certain types of traffic congestion conditions without cooperating with other vehicles. However, there are certain traffic congestion conditions that cannot be resolved by individual vehicles. For example, when autonomous vehicles are traveling at different speeds, if several vehicles are driving at similar lower speeds and are occupying all lanes, it may be impossible, or take a long time, for higher speed vehicles approaching from behind to overtake them, causing unnecessary traffic congestion.

Vehicle-to-vehicle (V2V) communication technologies, such as Dedicated Short Range Communication (DSRC), are beginning to be deployed in the automotive domain. Through V2V communication technology, autonomous vehicles can exchange various types of messages with their neighbors. To improve traffic flow, several driving strategies using vehicle-to-vehicle (V2V) communication technology have been proposed for Intelligent Transportation Systems (ITS). For example, a generalized model from which to derive lane-changing rules has been proposed. Other proposed solutions include a "polite" lane change maneuver, a predictive control vehicle driving system, a cooperative vehicular system based on V2V communication technology to accurately detect and characterize traffic congestion conditions under different traffic scenarios, and a coordinated merge control system based on V2V communication technologies.

SUMMARY

In one aspect, a method for traffic congestion avoidance using cooperative autonomous driving is disclosed. The method may include automatically detecting, by a given autonomous vehicle in a plurality of autonomous vehicles each executing a respective driving plan and having a respective maximum speed, that the given autonomous vehicle is in a deadlock condition in which the given autonomous vehicle is blocked from reaching its respective maximum speed by autonomous vehicles in two or more lanes. The method may also include initiating, by the given autonomous vehicle, formation of a coordination group including three of the autonomous vehicles, the three autonomous vehicles including the given autonomous vehicle, a front autonomous vehicle traveling in front of and in a same driving lane as the given autonomous vehicle, and an assistant autonomous vehicle traveling in a lane adjacent to the lane in which the given autonomous vehicle and the front autonomous vehicle are traveling, and sending, by the given autonomous vehicle using vehicle-to-vehicle communication, a cooperative driving task request to initiate actions by two or more autonomous vehicles in the coordination group to resolve the deadlock condition.

In any of the disclosed embodiments, automatically detecting that the given autonomous vehicle is in the deadlock condition may include obtaining, by each of the autonomous vehicles using vehicle-to-vehicle communication, respective vehicle information from one or more other autonomous vehicles within communication range including, for each of the other autonomous vehicles, a current speed of the other autonomous vehicle, the respective maximum speed of the other autonomous vehicle, a direction in which the other autonomous vehicle is traveling, and a current position of the other autonomous vehicle. The method may also include determining, dependent on the respective vehicle information obtained from the one or more other autonomous vehicles, that the given autonomous vehicle is in the deadlock condition.

In any of the disclosed embodiments, determining, dependent on the respective vehicle information obtained from the one or more other autonomous vehicles, that the given autonomous vehicle is in the deadlock condition may include determining that the front autonomous vehicle is traveling at its respective maximum speed, determining that the assistant autonomous vehicle is traveling at its respective maximum speed, determining that the respective maximum speed of the front autonomous vehicle is substantially the same as the respective maximum speed of the assistant autonomous vehicle and is a lower speed than the respective maximum speed of the given autonomous vehicle, and determining that the front autonomous vehicle and the assistant autonomous vehicle are blocking the lane in which the given autonomous vehicle and the front autonomous vehicle are traveling and the lane adjacent to the lane in which the given autonomous vehicle and the front autonomous vehicle are traveling, respectively, and preventing the given autonomous vehicle from traveling at its respective maximum speed.

In any of the disclosed embodiments, the method may further include storing, by each of the autonomous vehicles, the respective vehicle information obtained from the one or more other autonomous vehicles within communication range. The respective vehicle information may further include, for each of the other autonomous vehicles, one or more of a vehicle identifier for the other autonomous vehicle, a maximal acceleration of the other autonomous vehicle, a maximal deceleration of the other autonomous vehicle, a driving status indicating whether the other autonomous vehicle is in a maximum state in which it is traveling at its respective maximum speed, is in a deadlock condition, or is in a freerun state in which it is neither traveling at its respective maximum speed nor in a deadlock condition, and a group coordination status indicating whether or not the other autonomous vehicle is currently a member of a coordination group.

In any of the disclosed embodiments, the method may further include, subsequent to sending the cooperative driving task request to initiate actions by the two or more autonomous vehicles in the coordination group to resolve the deadlock condition, monitoring, by the given autonomous vehicle, respective vehicle information broadcast periodically by the autonomous vehicles in the coordination group using vehicle-to-vehicle communication, determining, dependent on the respective vehicle information broadcast periodically by the autonomous vehicles in the coordination group, that the deadlock condition is resolved, and initiating, by the given autonomous vehicle in response to determining that the deadlock condition is resolved, release of the coordination group.

In any of the disclosed embodiments, the method may further include, for each of the autonomous vehicles prior to automatically detecting that the given autonomous vehicle is in the deadlock condition, receiving input specifying the respective driving plan for the autonomous vehicle, and receiving input specifying the respective maximum speed for the autonomous vehicle. The cooperative driving request may initiate actions by the two or more autonomous vehicles in the coordination group to resolve the deadlock condition including one or more of modifying the respective driving plan of an autonomous vehicle in the coordination group to include a behavior coordination action and initiating a speed negotiation with an autonomous vehicle in the coordination group.

In any of the disclosed embodiments, the cooperative driving task request may be sent to the front autonomous vehicle and may instruct the front autonomous vehicle to change lanes into the adjacent lane in which the assistant autonomous vehicle is traveling. The method may further include modifying, by the front autonomous vehicle, the respective driving plan of the front autonomous vehicle to include a high priority task to change lanes into the adjacent lane in which the assistant autonomous vehicle is traveling.

In any of the disclosed embodiments, the method may further include sending, by the front autonomous vehicle to the assistant autonomous vehicle using vehicle-to-vehicle communication, a cooperative driving task request instructing the assistant autonomous vehicle to reduce its speed by an amount sufficient to make space in the adjacent lane into which the front autonomous vehicle can change lanes.

In any of the disclosed embodiments, the method may further include obtaining, by the front autonomous vehicle using vehicle-to-vehicle communication, vehicle information from an autonomous vehicle in front of the assistant autonomous vehicle in the adjacent lane, determining, based on the vehicle information obtained from the autonomous vehicle in front of the assistant autonomous vehicle in the adjacent lane that the autonomous vehicle in front of the assistant autonomous vehicle is traveling at its respective maximum speed, which is substantially the same as the respective maximum speed of the front autonomous vehicle, and reducing, by the front autonomous vehicle, the speed of the front autonomous vehicle by an amount that is greater than the amount by which the speed of the assistant autonomous vehicle is requested to reduce its speed.

In any of the disclosed embodiments, initiating formation of the coordination group may include changing, by the given autonomous vehicle, a coordination group status for the given autonomous vehicle from free to busy, sending, by the given autonomous vehicle to the front autonomous vehicle using vehicle-to-vehicle communication, a coordination request, receiving, by the given autonomous vehicle from the front autonomous vehicle using vehicle-to-vehicle communication, a coordination confirmation, changing, by the front autonomous vehicle, a coordination group status for the front autonomous vehicle from free to busy, sending, by the front autonomous vehicle to the assistant autonomous vehicle using vehicle-to-vehicle communication, an assistance request, receiving, by the front autonomous vehicle from the assistant autonomous vehicle using vehicle-to-vehicle communication, an assistance confirmation, and changing, by the assistant autonomous vehicle, a coordination group status for the assistant autonomous vehicle from free to busy.

In another aspect, a system for traffic congestion avoidance using cooperative autonomous driving is disclosed. The system may include a plurality of autonomous vehicles each executing a respective driving plan and being associated with a respective maximum speed. Each autonomous vehicle may include a processor, and memory media storing program instructions that when executed by the processor cause the processor to implement a cooperative driving strategy. The cooperative driving strategy may include, for a given one of the autonomous vehicles, automatically detecting that the given autonomous vehicle is in a deadlock condition in which the given autonomous vehicle is blocked from reaching its respective maximum speed by autonomous vehicles in two or more lanes, initiating formation of a coordination group including three of the autonomous vehicles, the three autonomous vehicles including the given autonomous vehicle, a front autonomous vehicle traveling in front of and in a same driving lane as the given autonomous vehicle, and an assistant autonomous vehicle traveling in a lane adjacent to the lane in which the given autonomous vehicle and the front autonomous vehicle are traveling, and transmitting a cooperative driving task request using vehicle-to-vehicle communication to initiate actions by the front autonomous vehicle and the assistant autonomous vehicle in the coordination group to resolve the deadlock condition.

In any of the disclosed embodiments, each of the autonomous vehicles may further include a respective wireless vehicle-to-vehicle communication system. Automatically detecting that the given autonomous vehicle is in the deadlock condition may include obtaining, by each of the autonomous vehicles using the respective wireless vehicle-to-vehicle communication system, respective vehicle information from one or more other autonomous vehicles within communication range of the autonomous vehicle including, for each of the other autonomous vehicles, a current speed of the other autonomous vehicle, the respective maximum speed of the other autonomous vehicle, a direction in which the other autonomous vehicle is traveling, and a current position of the other autonomous vehicle, and determining, dependent on the respective vehicle information obtained from the one or more other autonomous vehicles, that the given autonomous vehicle is in the deadlock condition.

In any of the disclosed embodiments, determining, dependent on the respective vehicle information obtained from the one or more other autonomous vehicles, that the given autonomous vehicle is in the deadlock condition may include determining that the front autonomous vehicle is traveling at its respective maximum speed, determining that the assistant autonomous vehicle is traveling at its respective maximum speed, determining that the respective maximum speed of the front autonomous vehicle is substantially the same as the respective maximum speed of the assistant autonomous vehicle and is a lower speed than the respective maximum speed of the given autonomous vehicle, and determining that the front autonomous vehicle and the assistant autonomous vehicle are blocking the lane in which the given autonomous vehicle and the front autonomous vehicle are traveling and the lane adjacent to the lane in which the given autonomous vehicle and the front autonomous vehicle are traveling, respectively, and preventing the given autonomous vehicle from traveling at its respective maximum speed.

In any of the disclosed embodiments, the memory media of each of the autonomous vehicles further store the respective vehicle information obtained from the one or more other autonomous vehicles within communication range of the autonomous vehicle, and the respective vehicle information obtained from each of the other autonomous vehicles may further include one or more of a vehicle identifier for the other autonomous vehicle, a maximal acceleration of the other autonomous vehicle, a maximal deceleration of the other autonomous vehicle, a driving status indicating whether the other autonomous vehicle is in a maximum state in which it is traveling at its respective maximum speed, is in a deadlock condition, or is in a freerun state in which it is neither traveling at its respective maximum speed nor in a deadlock condition, and a group coordination status indicating whether or not the other autonomous vehicle is currently a member of a coordination group.

In any of the disclosed embodiments, each of the autonomous vehicles may further include a wireless vehicle-to-vehicle communication system. The cooperative driving strategy may further include, subsequent to initiating the actions by the front autonomous vehicle and the assistant autonomous vehicle in the coordination group to resolve the deadlock condition, monitoring, by the given autonomous vehicle, respective vehicle information broadcast periodically by the autonomous vehicles in the coordination group using the respective wireless vehicle-to-vehicle communication systems, determining, dependent on the respective vehicle information broadcast periodically by the autonomous vehicles in the coordination group, that the deadlock condition is resolved, and initiating, by the given autonomous vehicle in response to determining that the deadlock condition is resolved, release of the coordination group.

In any of the disclosed embodiments, the cooperative driving strategy may further include, for each of the autonomous vehicles prior to automatically detecting that the given autonomous vehicle is in the deadlock condition, receiving input specifying the respective driving plan for the autonomous vehicle, and receiving input specifying the respective maximum speed for the autonomous vehicle. The cooperative driving request may initiate actions by the front autonomous vehicle and the assistant autonomous vehicle in the coordination group to resolve the deadlock condition including one or more of modifying the respective driving plan of an autonomous vehicle in the coordination group to include a behavior coordination action and initiating a speed negotiation with an autonomous vehicle in the coordination group.

In any of the disclosed embodiments, the cooperative driving task request may be transmitted to the front autonomous vehicle and may instruct the front autonomous vehicle to change lanes into the adjacent lane in which the assistant autonomous vehicle is traveling. The cooperative driving strategy may further include, for the front autonomous vehicle, modifying the respective driving plan of the front autonomous vehicle to include a high priority task to change lanes into the adjacent lane in which the assistant autonomous vehicle is traveling.

In any of the disclosed embodiments, the cooperative driving strategy may further include, for the front autonomous vehicle, transmitting to the assistant autonomous vehicle using vehicle-to-vehicle communication, a cooperative driving task request instructing the assistant autonomous vehicle to reduce its speed by an amount sufficient to make space in the adjacent lane into which the front autonomous vehicle can change lanes.

In any of the disclosed embodiments, the cooperative driving strategy may further include, for the front autonomous vehicle, obtaining, using vehicle-to-vehicle communication, vehicle information from an autonomous vehicle in front of the assistant autonomous vehicle in the adjacent lane, determining, based on the vehicle information obtained from the autonomous vehicle in front of the assistant autonomous vehicle in the adjacent lane that the autonomous vehicle in front of the assistant autonomous vehicle is traveling at its respective maximum speed, which is substantially the same as the respective maximum speed of the front autonomous vehicle, and reducing the speed of the front autonomous vehicle by an amount that is greater than the amount by which the speed of the assistant autonomous vehicle is requested to reduce its speed.

In any of the disclosed embodiments, each of the autonomous vehicles may further include a respective wireless vehicle-to-vehicle communication system. Initiating formation of the coordination group may include changing a coordination group status for the given autonomous vehicle from free to busy, transmitting, to the front autonomous vehicle using the wireless vehicle-to-vehicle communication system of the given autonomous vehicle, a coordination request, and receiving, from the front autonomous vehicle using the wireless vehicle-to-vehicle communication system of the given autonomous vehicle, a coordination confirmation. The cooperative driving strategy may further include, for the front autonomous vehicle, receiving, from the given autonomous vehicle using the wireless vehicle-to-vehicle communication system of the front autonomous vehicle, the coordination request, changing a coordination group status for the front autonomous vehicle from free to busy, transmitting, to the given autonomous vehicle using the wireless vehicle-to-vehicle communication system of the front autonomous vehicle, the coordination confirmation, transmitting, to the assistant autonomous vehicle using the wireless vehicle-to-vehicle communication system of the front autonomous vehicle, an assistance request, and receiving, from the assistant autonomous vehicle using the wireless vehicle-to-vehicle communication system of the front autonomous vehicle, an assistance confirmation. The cooperative driving strategy may further include, for the assistant autonomous vehicle, receiving, from the front autonomous vehicle using the wireless vehicle-to-vehicle communication system of the assistant autonomous vehicle, the assistance request, changing a coordination group status for the assistant autonomous vehicle from free to busy, and transmitting, to the front autonomous vehicle using the wireless vehicle-to-vehicle communication system of the assistant autonomous vehicle, the assistance confirmation.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1A:
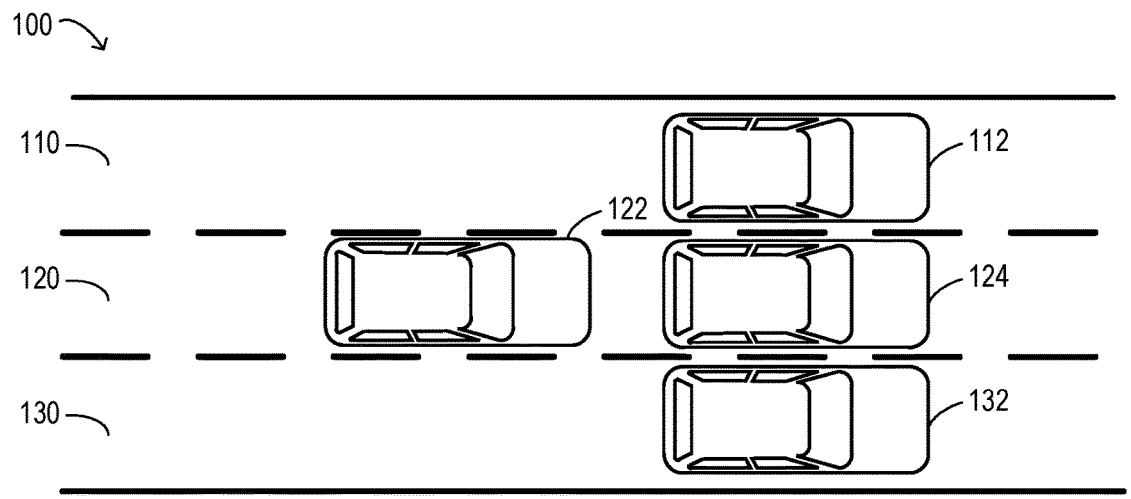
FIGS. 1A and 1B illustrate two example traffic arrangements in which an autonomous vehicle is deadlocked.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

An autonomous vehicle may self-drive to its destination location according to a predefined driving plan, while attaining a speed as high as a maximum speed set by the human driver (not to exceed the legal speed limit). However, autonomous driving vehicles traveling at different speeds might obstruct each other, which may slow down traffic flow and cause congestion. In some embodiments of the present disclosure, to avoid traffic congestion, an autonomous vehicle may intelligently identify its current driving condition and take appropriate actions when necessary. In the description that follows, driving conditions are classified into multiple types, one of which represents a special deadlock condition that causes traffic congestion. An autonomous vehicle stuck in this deadlock condition is driving in a suboptimal condition that cannot be resolved by the autonomous vehicle itself. In some embodiments, a cooperative driving strategy (Altruistic Cooperative Driving) based on vehicle-to-vehicle communications and group coordination may be used to resolve the deadlock condition, allowing a previously deadlocked autonomous vehicle to escape the deadlock condition and avoid unnecessary congestion.

As noted above, three types of vehicle driving conditions may be defined for analyzing the driving status of an autonomous vehicle, as follows:

Maximum: The autonomous vehicle has already attained its maximum speed and is moving forward at its maximum speed.

Deadlock: The autonomous vehicle has not yet attained its maximum speed. In addition, the autonomous vehicle is blocked from accelerating and changing lanes by other autonomous vehicles. Therefore, the autonomous vehicle may have to follow a vehicle traveling at a lower speed.

Freerun: The autonomous vehicle is neither in the maximum condition nor in the deadlock condition. The autonomous vehicle is able to accelerate, although it has not yet attained its maximum speed.

Figure 1B:
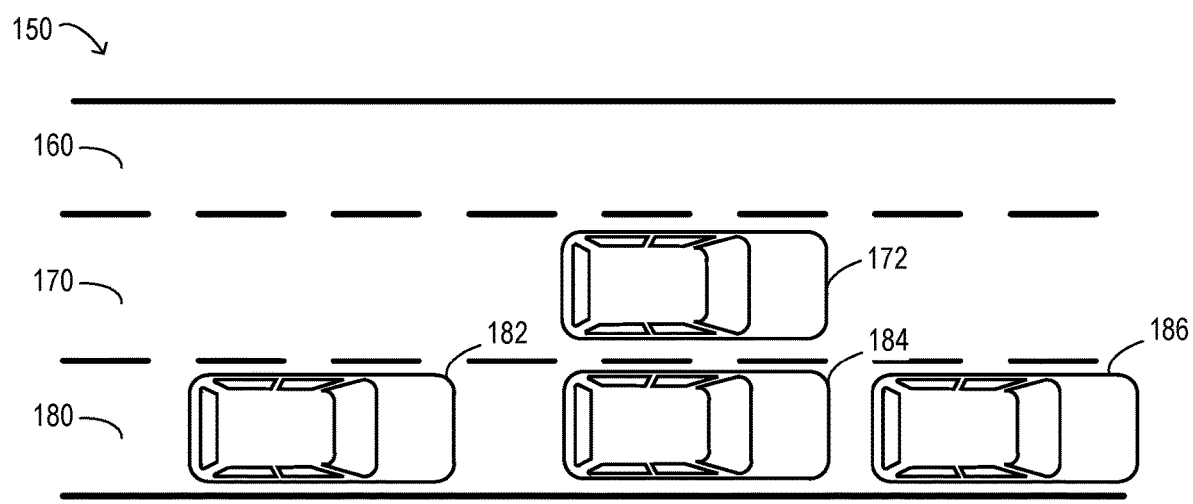

FIGS. 1A and 1B illustrate two example traffic arrangements in which an autonomous vehicle is deadlocked, as described above. For example, FIG. 1A illustrates an example traffic arrangement 100 in which autonomous vehicle 122 in lane 120 is in a deadlock condition. In this example, several vehicles that have attained their respective maximum speeds, which are the same or similar maximum speeds and are lower than the maximum speed of autonomous vehicle 122, are occupying all lanes in front of autonomous vehicle 122. More specifically, autonomous vehicle 112 in lane 110, autonomous vehicle 124 in lane 120. and autonomous vehicle 132 in lane 130, which are traveling at the same maximum speed are driving in front of autonomous vehicle 122 in lane 120 and are blocking autonomous vehicle 122 from attaining its higher maximum speed.

FIG. 1B illustrates an example traffic arrangement 150 in which autonomous vehicle 184 in lane 180 is in a deadlock condition. In this example, autonomous vehicle 184 is surrounded by several autonomous vehicles traveling at their respective maximum speeds, which are the same or similar maximum speeds and are lower than the maximum speed of autonomous vehicle 184. In this example, autonomous vehicle 184 is blocked from attaining its higher maximum speed by autonomous vehicle 172 in lane 170 and autonomous vehicle 186 in lane 180, which are traveling at their lower maximum speeds, and by autonomous vehicle 182 in lane 180, which is following autonomous vehicle 184 has penned autonomous vehicle 184 in place between autonomous vehicle 182 and autonomous vehicle 186. In this example, lane 160 is clear, but autonomous vehicle 184 is unable to change lanes to reach lane 160.

Figure 2:
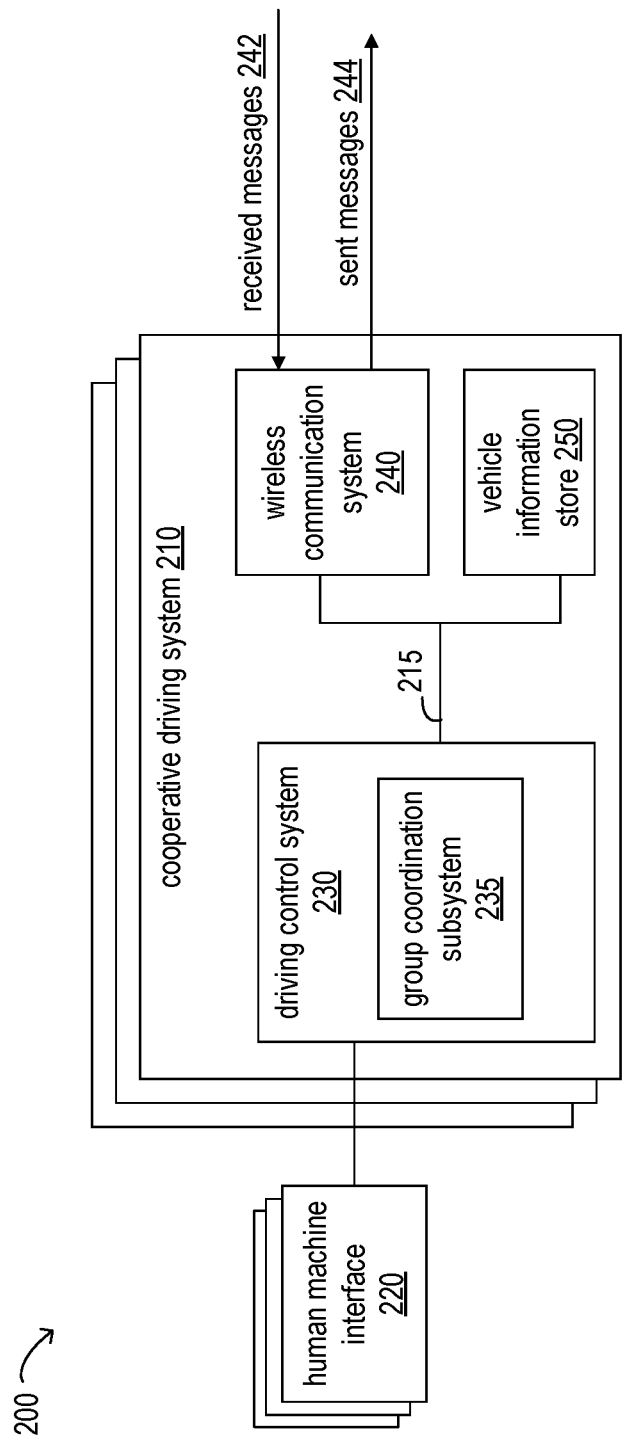
FIG. 2 is a block diagram illustrating selected elements of an example system for cooperative autonomous driving for traffic congestion avoidance through vehicle-to-vehicle communications, according to one embodiment.

FIG. 2 is a block diagram illustrating selected elements of an example system for cooperative autonomous driving for traffic congestion avoidance through vehicle-to-vehicle communications, according to one embodiment. In the illustrated embodiment, system 200 includes, in each of multiple autonomous vehicles, a respective cooperative driving system 210 and a respective human machine interface 220. In various embodiments, human machine interface 220 may include a display device and one or more user input mechanisms, such as a keyboard or a mouse, a touch panel, a microphone, or a camera. In at least some embodiments, driving parameters may be input by a user (e.g., a human driver or passenger in the autonomous vehicle) through human machine interface 220. These parameters may include, but are not limited to, a destination location for a particular journey and a maximum speed for the particular journey (or, in some embodiments, a default maximum speed for transporting the user or for operating the autonomous vehicle). In some embodiments, a human driver or passenger may set up a driving plan in cooperative driving system 210 using human machine interface 220. For example, the human driver or passenger may input pairs of values in the form of R(d, m) to denote a driving plan R in which d represents a destination location and m represents a maximum speed for the autonomous driving vehicle and/or the journey to destination location d.

In the illustrated example, the cooperative driving system 210 includes driving control system 230, wireless communication system 240, through which cooperative driving system 210 receives messages 242 transmitted by other autonomous vehicles and transmits messages 244 to other autonomous vehicles, and vehicle information store 250, all of which are communicatively coupled to each other over bus 215.

In some embodiments, wireless communication system 240 may include circuitry or logic to implement a standard or custom vehicle-to-vehicle communication protocol using Dedicated Short Range Communication (DSRC) technology, for example. In the illustrated example, driving control system 230 includes group coordination subsystem 235, which may include circuitry or logic to implement cooperative autonomous driving for traffic congestion avoidance, as described herein. More specifically, group coordination subsystem 235 may be operable to determine when and whether the autonomous vehicle is in a deadlock condition, to initiate the formation of coordination groups including the autonomous vehicle and multiple other autonomous vehicles, and/or to determine cooperative driving tasks for other autonomous vehicles in a coordination group to take to resolve a deadlock condition, among other functionality.

As described in more detail herein, driving control system 230 may store driving plans, vehicle information about the autonomous vehicle, and vehicle information obtained by wireless communication system 240 from one or more other autonomous vehicles within communication range of the autonomous vehicle in vehicle information store 250. The stored information may be used to determine when and whether the autonomous vehicle is in a deadlock condition and/or to determine the cooperative driving tasks for the other autonomous vehicles in a coordination group to take to resolve a deadlock condition.

As previously noted, in order to avoid the traffic congestion caused by the deadlock condition, the systems described herein may implement a cooperative autonomous driving strategy called Altruistic Cooperative Driving (ACD), in which the autonomous vehicles that are causing congestion temporarily yield the right-of-way to other vehicles (e.g., by slowing down, changing lanes, etc.) for the benefit of improving overall traffic efficiency (hence the name "altruistic cooperative driving"). In at least some embodiments, the autonomous vehicles may exchange messages with each other through vehicle-to-vehicle (V2V) communication (e.g., 5.9 GHz DSRC) to detect and resolve congestion conditions collaboratively.

In some embodiments, an Altruistic Cooperative Driving procedure may include the following four steps: (1) identifying that a given autonomous vehicle (sometimes referred to herein as 'the current vehicle' or simply as 'the vehicle') is in the deadlock condition; (2) establishing a coordination group including the current autonomous vehicle and multiple other autonomous vehicles; (3) resolving the deadlock condition for the current autonomous vehicle through behavior coordination and speed negotiation among the members of the coordination group; and (4) releasing the coordination group once the deadlock condition has been resolved. This procedure is illustrated in more detail in the figures and descriptions that follow.

Figure 3:
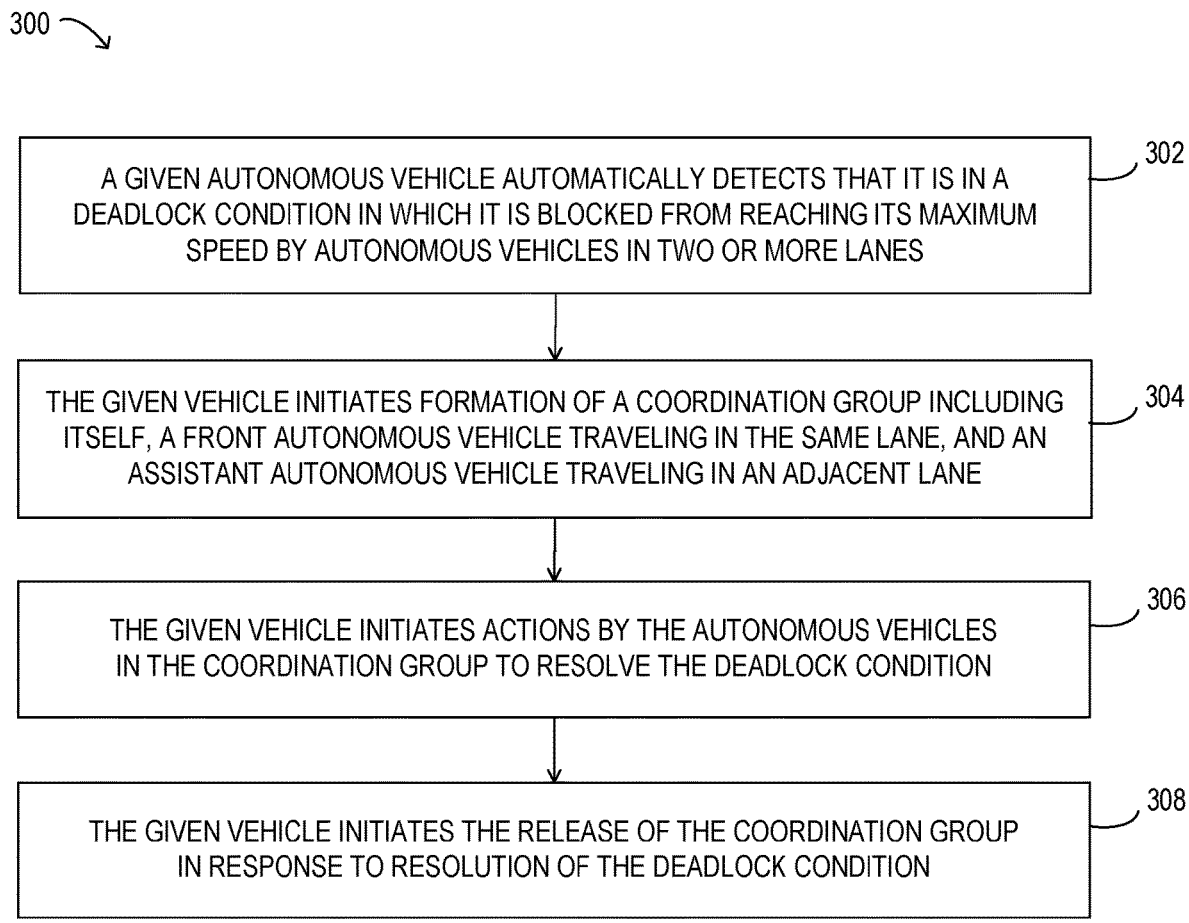
FIG. 3 is a flow diagram illustrating selected elements of an example method for implementing cooperative autonomous driving for traffic congestion avoidance through vehicle-to-vehicle communications, according to some embodiments.
Figure 4:
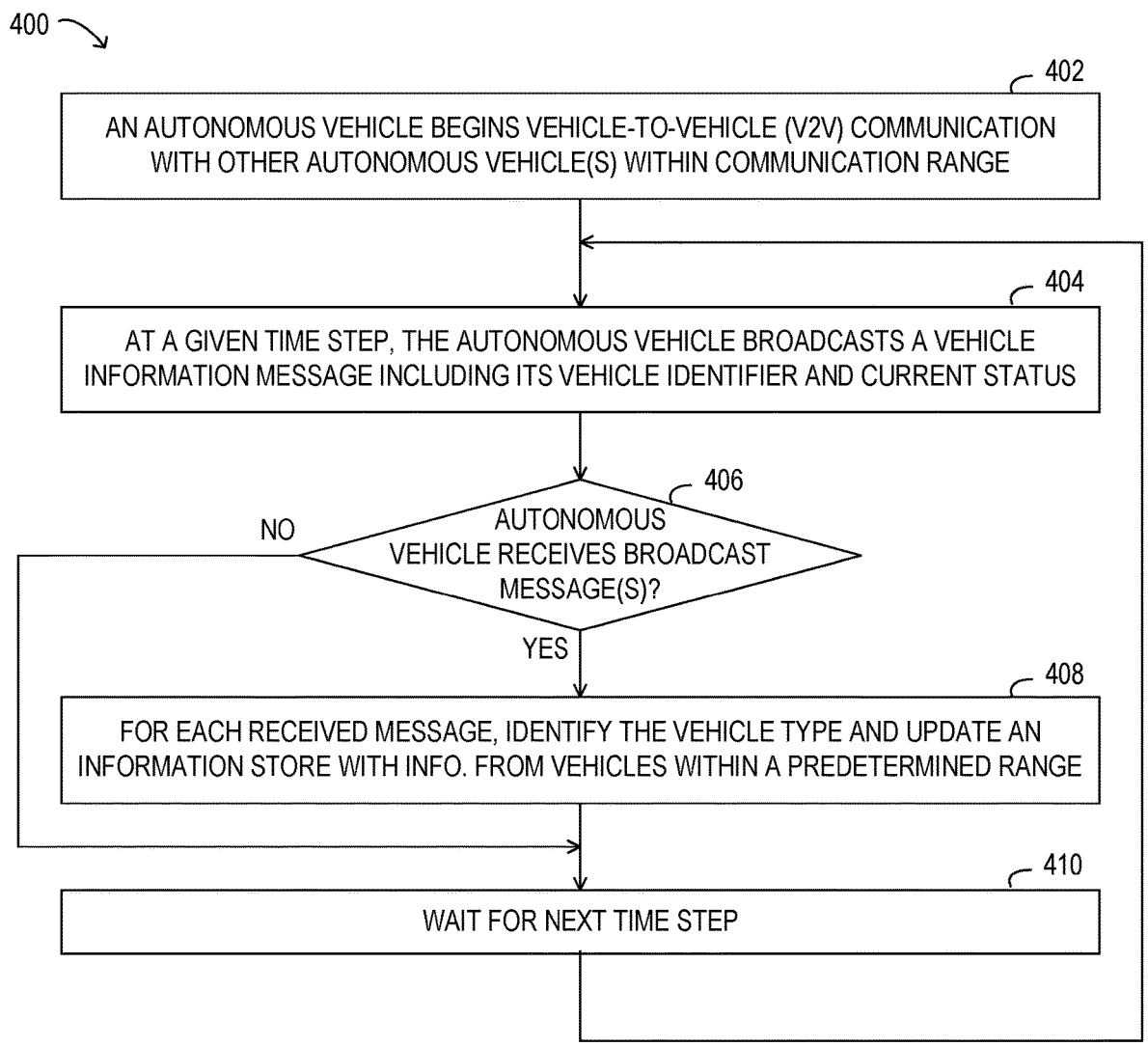
FIG. 4 is a flow diagram illustrating selected elements of an example method for exchanging vehicle information between connected autonomous vehicles using vehicle-to-vehicle communication, according to some embodiments.
Figure 6:
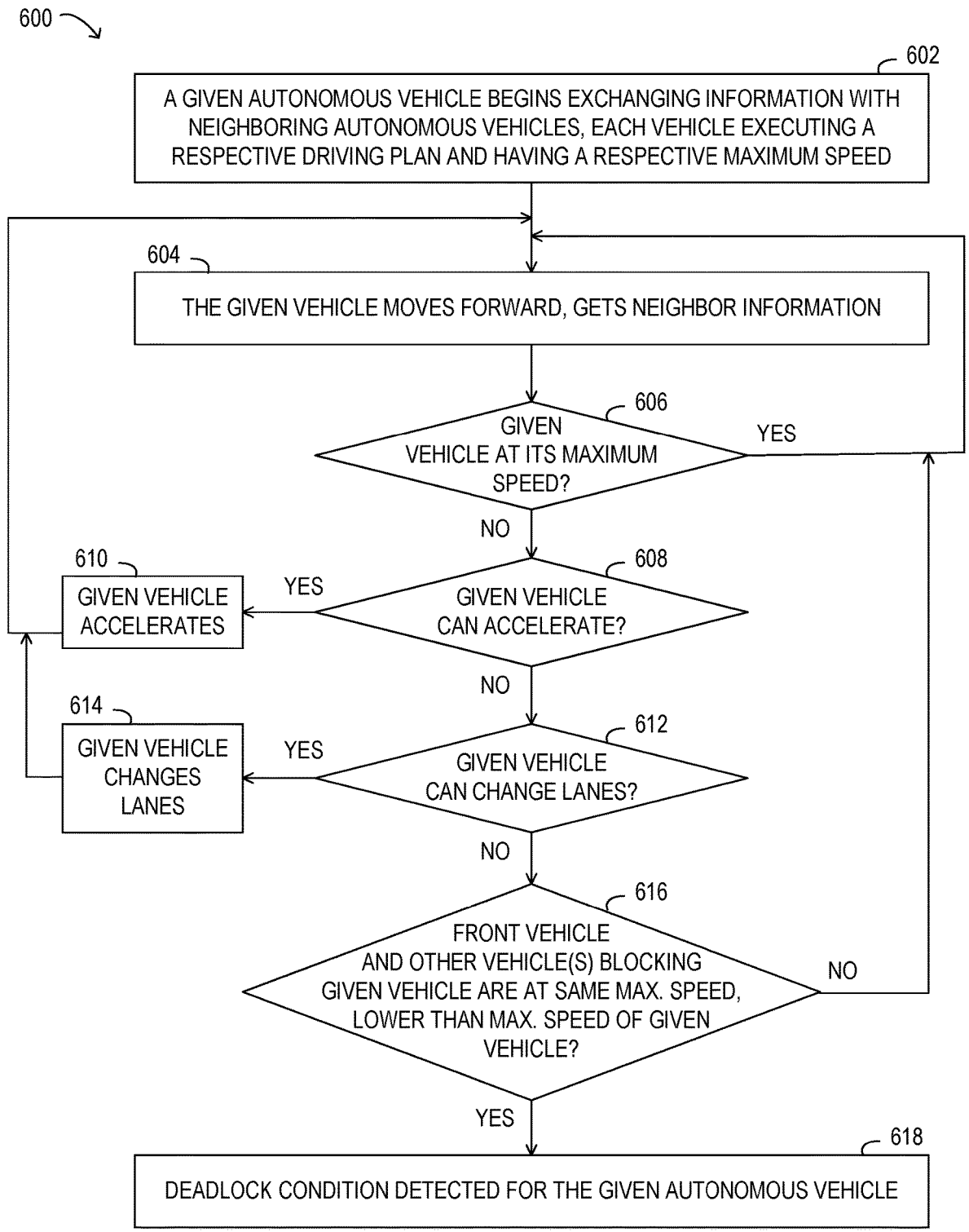
FIG. 6 is a flow diagram illustrating selected elements of an example method for automatically detecting that an autonomous vehicle is in a deadlock condition, according to some embodiments.

FIG. 3 is a flow diagram illustrating selected elements of an example method for implementing cooperative autonomous driving for traffic congestion avoidance through vehicle-to-vehicle communications, according to one embodiment. In some embodiments, some or all of the operations shown in FIG. 3 may be performed by a driving control system (such as driving control system 230 illustrated in FIG. 2) or by a group coordination subsystem thereof (such as group coordination subsystem 235 illustrated in FIG. 2). In the illustrated example, method 300 includes, at 302, a given autonomous vehicle automatically detecting that it is in a deadlock condition in which it is blocked from reaching its maximum speed by autonomous vehicles in two or more lanes. In at least some embodiments, detecting the deadlock condition may include obtaining information from other autonomous vehicles in the neighborhood of the given autonomous vehicle and using that information to determine whether or not the given autonomous vehicle is in a deadlock condition. An example method for obtaining information from other autonomous vehicles using vehicle-to-vehicle communication is illustrated in FIG. 4 and described below. An example method for automatically detecting that an autonomous vehicle is in a deadlock condition is illustrated in FIG. 6 and described below.

Figure 7:
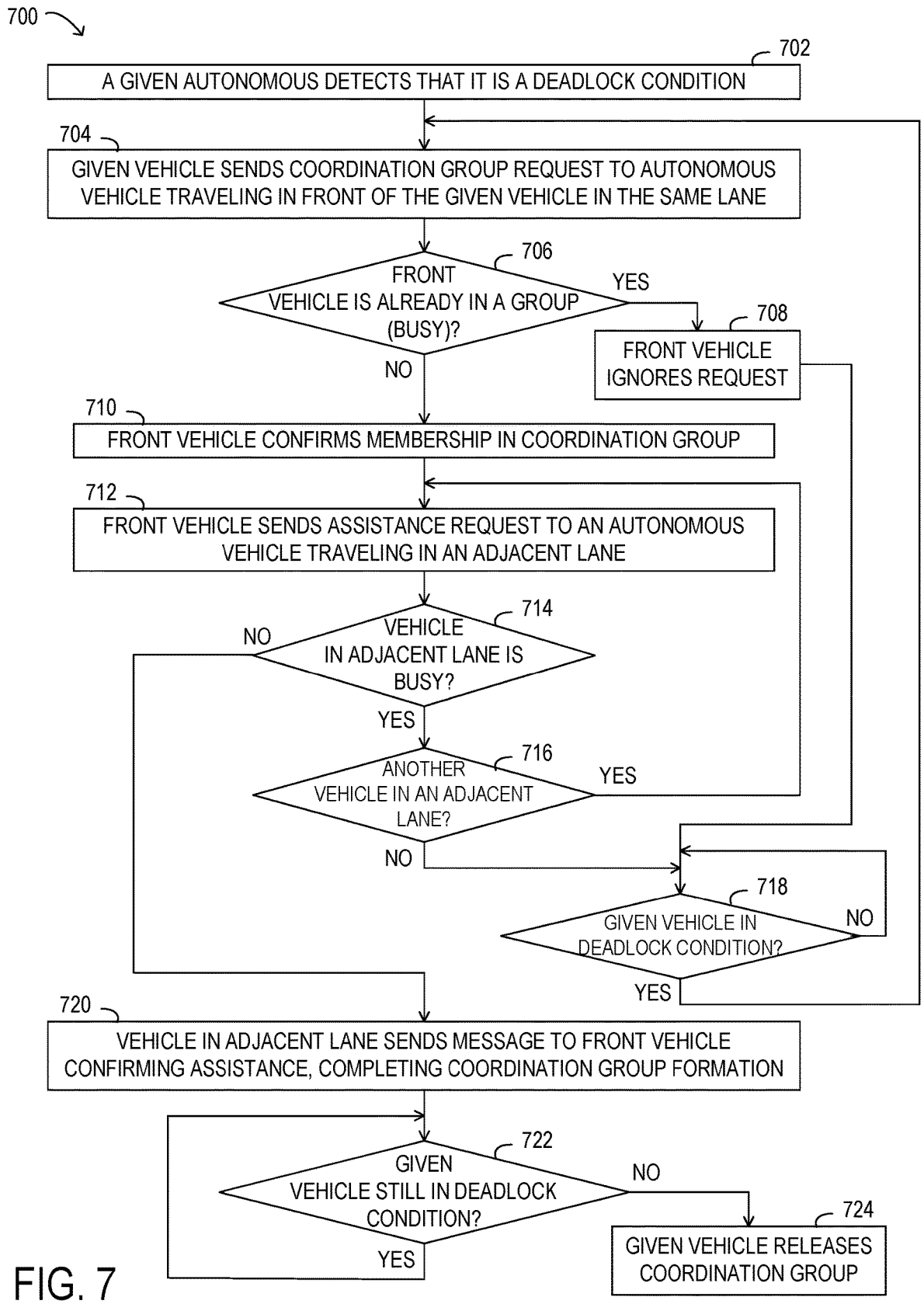
FIG. 7 is a flow diagram illustrating selected elements of an example method for dynamically forming, and subsequently releasing, a coordination group using V2V communication, according to some embodiments.

Method 300 also includes, at 304, the given autonomous vehicle initiating formation of a coordination group including the given autonomous vehicle itself, a front autonomous vehicle traveling in the same lane, and an assistant autonomous vehicle traveling in an adjacent lane. An example method for dynamically forming a coordination group using vehicle-to-vehicle communication is illustrated in FIG. 7 and described below. Method 300 also includes, at 306, the given autonomous vehicle initiating actions by the autonomous vehicles in the coordination group to resolve the deadlock condition. In at least some embodiments, initiating the actions may include the given autonomous vehicle sending cooperative driving task requests to one or more other autonomous vehicles in the coordination group using vehicle-to-vehicle communication. Specific examples of the types of cooperative driving tasks that may be performed by autonomous vehicles in the coordination group to resolve deadlock conditions are illustrated in FIGS. 10A-10F and 11A-11F and described below.

Figure 8:
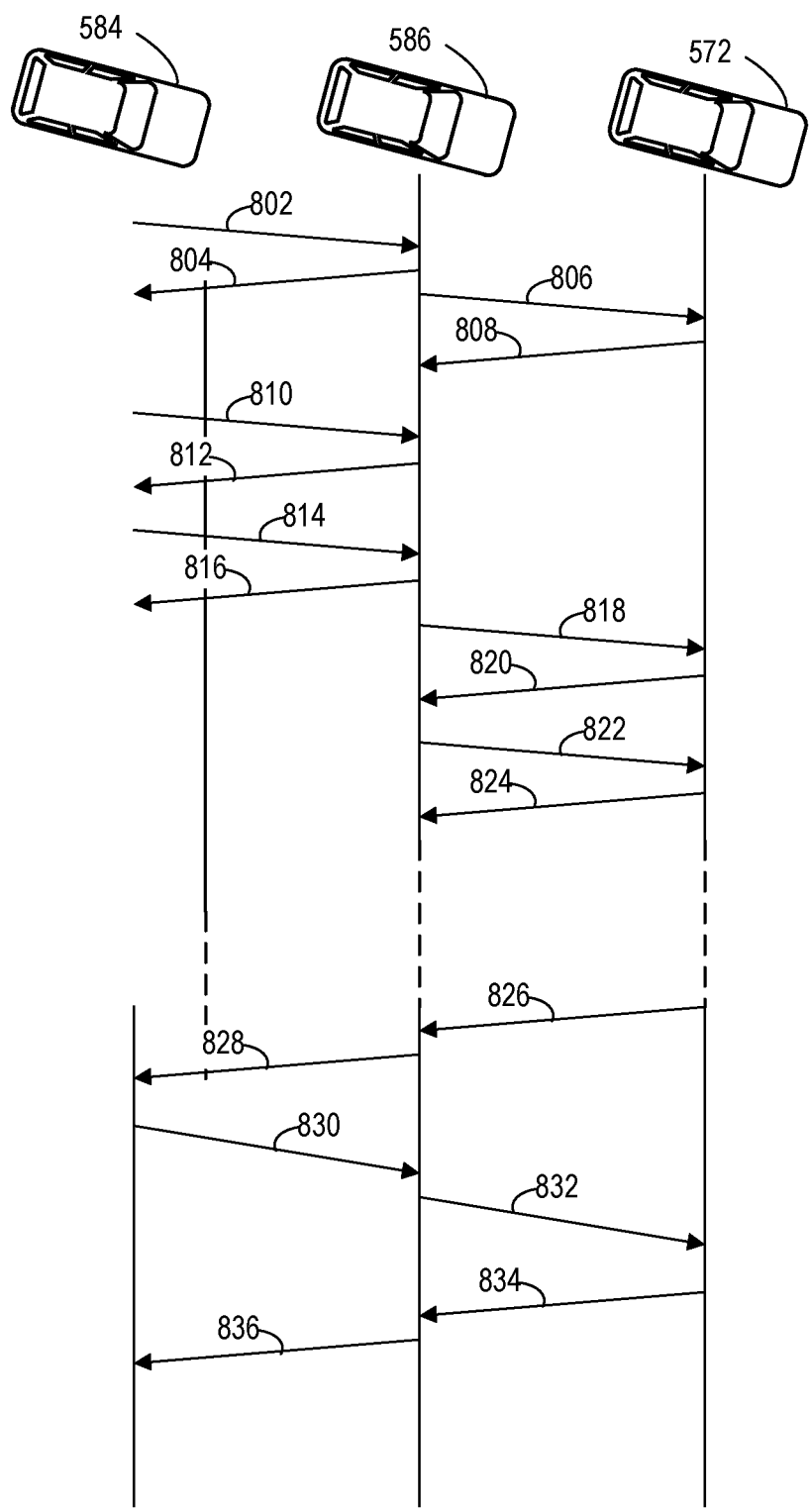
FIG. 8 illustrates example messages exchanged between autonomous vehicles in a coordination group, according to one embodiment.

Method 300 also includes, at 308, the given autonomous vehicle initiating the release of the coordination group in response to resolution of the deadlock condition. In some embodiments, after initiating actions by the autonomous vehicles in the coordination group to resolve the deadlock condition, the given autonomous vehicle may monitor vehicle information obtained from the autonomous vehicles in the coordination group to determine when and if the deadlock condition is resolved. Once the given autonomous vehicle determines that the deadlock condition is resolved, the given autonomous vehicle may send messages to one or more other autonomous vehicles in the coordination group to initiate the release of the coordination group. Examples of the messages exchanged between autonomous vehicles in order to form, and subsequently release, a coordination group and to take action to collaboratively resolve a deadlock condition are illustrated in FIG. 8 and described below. Note that method 300 illustrated in FIG. 3 is an example embodiment and that in other embodiments, a method for implementing cooperative autonomous driving for traffic congestion avoidance through vehicle-to-vehicle communications may include more, fewer, or different operations, including operations performed in an order different than that illustrated in FIG. 3.

In step 1 of an ACD procedure, a current autonomous vehicle may communicate with its neighbors through vehicle-to-vehicle (V2V) communication to continuously detect and collect vehicle information associated with its neighbors and may use that information to determine whether or not it is in a deadlock condition. Examples of the vehicle information elements that may be exchanged between autonomous vehicles using V2V communication are described below in reference to FIGS. 5A through 5C. Through V2V communications, neighboring autonomous vehicles may also exchange various other types of messages, including messages used to form and subsequently release coordination groups and messages used to initiate actions to resolve deadlock conditions through behavior coordination and/or speed negotiation. By exchanging vehicle information as well as driving intentions, the connected autonomous vehicles in a coordination group may be able to prevent, reduce, or resolve traffic congestion conditions through effective cooperative driving strategies.

FIG. 4 is a flow diagram illustrating selected elements of an example method for exchanging vehicle information between connected autonomous vehicles using vehicle-to-vehicle communication, according to some embodiments. In some embodiments, some or all of the operations shown in FIG. 4 may be performed by a respective driving control system of each autonomous vehicle (such as driving control system 230 illustrated in FIG. 2) or by a group coordination subsystem thereof (such as group coordination subsystem 235 illustrated in FIG. 2). In the illustrated example, method 400 includes, at 402, an autonomous vehicle beginning vehicle-to-vehicle (V2V) communication with one or more other autonomous vehicles within communication range. For example, the autonomous vehicle may exchange messages with the other autonomous vehicles using DSRC technology, in some embodiments.

Method 400 also includes, at a given time step within a period of time during which the connected autonomous vehicles are in communication range of each other, the autonomous vehicle broadcasting a vehicle information message including at least its vehicle identifier and current driving status, as in 404. In certain embodiment, the vehicle information message may include more, less, or different vehicle information, including any or all of the vehicle information described herein.

If, at 406, the autonomous vehicle receives one or more broadcast messages from other autonomous vehicles, the method may continue to 408. Otherwise, the method may proceed to 410. At 408, the method may include, for each such message it receives, identifying the vehicle type and updating a vehicle information store with vehicle information received from autonomous vehicles within a predetermined range. For example, while any number of other autonomous vehicles broadcasting their vehicle information may be in communication range of the autonomous vehicle, the driving control system may be operable to store only the vehicle information broadcast by the autonomous vehicles that are the shortest distance from the autonomous vehicle in the same lane (ahead and behind the autonomous vehicle) and in immediately adjacent lanes (ahead of, beside, or behind the autonomous vehicle), while ignoring or discarding vehicle information that is received from autonomous vehicles farther away from the autonomous vehicle. In another example, the driving control system may be operable to store only the vehicle information broadcast by autonomous vehicles that are within a predetermined threshold distance from the autonomous vehicle in the same lane (ahead and behind the autonomous vehicle) and in immediately adjacent lanes (ahead of, beside, or behind the autonomous vehicle). In either case, the driving control system may be operable to discard previously stored vehicle information each time it receives vehicle information broadcast by other autonomous vehicles that it chooses to store. For example, in some embodiments the information in the vehicle information store may be replaced at each time step.

At 410, method 400 includes waiting for the next time step, after which the operations shown as 404 to 410 may be repeated at each additional time step. In some embodiments, the autonomous vehicle may broadcast vehicle information at each time step but may be operable to receive vehicle information broadcast by other autonomous vehicles at any time (e.g., asynchronously). In some embodiments, all of the autonomous vehicles may broadcast their vehicle information at approximately the same time during each time step. Note that method 400 illustrated in FIG. 4 is an example embodiment and that in other embodiments, a method for exchanging vehicle information between connected autonomous vehicles using vehicle-to-vehicle communication may include more, fewer, or different operations, including operations performed in an order different than that illustrated in FIG. 4.

Figure 5A:
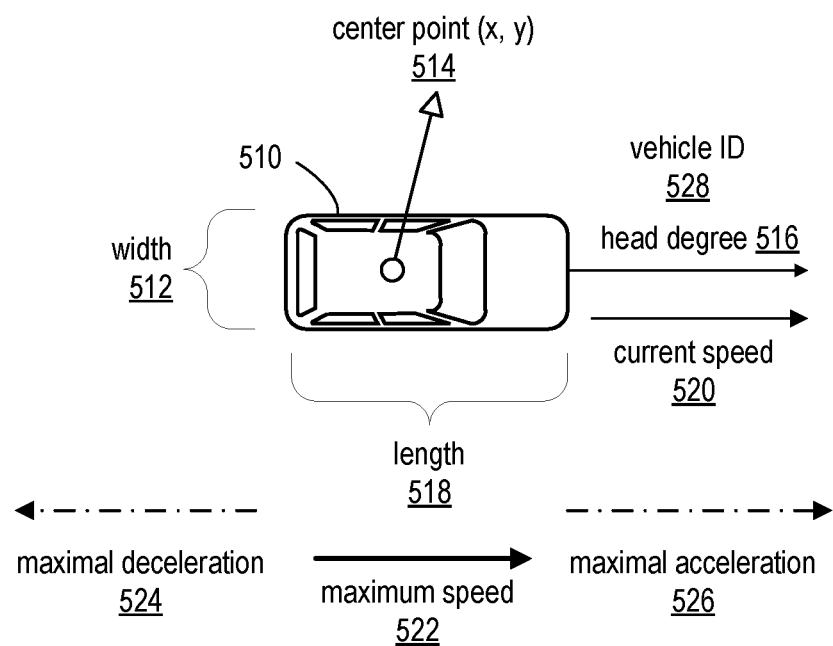
FIG. 5A illustrates example elements of the vehicle information that may be exchanged between autonomous vehicles using vehicle-to-vehicle communication, according to some embodiments.

FIG. 5A illustrates example elements of the vehicle information that may be exchanged between autonomous vehicles using vehicle-to-vehicle communication, according to some embodiments. In various embodiments, the vehicle information broadcast by the autonomous vehicles may include some or all of the elements illustrated in FIG. 5A, as well as other elements. Each autonomous vehicle may store any or all of these vehicle information elements as they relate to the autonomous vehicle itself in an information store, such as vehicle information store 250 illustrated in FIG. 2. Each autonomous vehicle may also store in the information store any or all of these vehicle information elements as they relate to other autonomous vehicles from which vehicle information is obtained using vehicle-to-vehicle communication.

As shown in FIG. 5A, the vehicle information exchanged with and/or stored by autonomous vehicle 510 may include, for autonomous vehicle 510, a vehicle identifier (ID) 528, a position or location indicator for autonomous vehicle 510 shown as center point 514, which may be expressed as coordinates in a two dimensional plane, the length 518 of autonomous vehicle 510, the width 512 of autonomous vehicle 510, the current speed 520 of autonomous vehicle 510, a maximum speed 522 for autonomous vehicle 510, a head degree 516 indicating the direction in which autonomous vehicle 510 is traveling, a maximal deceleration 524 for autonomous vehicle 510, and/or a maximal acceleration 526 for autonomous vehicle 510. In some embodiments, the coordinate values representing center point 514 may be expressed as a combination of longitude and latitude values (such as those used in high precision, high resolution mapping solutions) or may be formatted in accordance with global positioning system (GPS) coordinate formatting conventions.

In some embodiments, vehicle ID 528 may indicate the type of autonomous vehicle 510, from which other vehicle information elements may be ascertained. In such embodiments, the vehicle information elements that can be ascertained from the vehicle ID or type might not be broadcast to other autonomous vehicles. For example, each type of autonomous vehicle (e.g., each particular type of autonomous sedan, sport utility vehicle, or truck) may have a known width 512, length 518, maximal deceleration 524, maximal acceleration 526, and/or default maximum speed 522. In some embodiments, one or more of the vehicle information elements stored in association with autonomous vehicle 510 may have been defined based on user input, such as through human machine interface 220 illustrated in FIG. 2. In some embodiments, one or more of the vehicle information elements stored in association with autonomous vehicle 510 may have been determined based on an applicable user-specific, vehicle-type-specific, location- or region-specific, or system-wide policy enforced by the cooperative autonomous driving system.

As noted above, three different vehicle driving conditions may be defined for analyzing the driving status of an autonomous vehicle: maximum, deadlock, and freerun. In at least some embodiments, a two-tuple $G_i=(N_i, S_i)$ may be used to describe a current driving status G for an autonomous vehicle i, where the value of $N_i$ indicates the current driving condition for autonomous vehicle i, and the value $S_i$ indicates whether or not autonomous vehicle i is currently being controlled through a coordination group. In at least some embodiments, $S_i$ may be set to the value 'free' when autonomous vehicle i is not being controlled through a coordination group and is free to join a coordination group, and $S_i$ may be set to the value 'busy' when autonomous vehicle i is currently engaged in a coordination group. In some embodiments, each autonomous vehicle can belong to at most one coordination group at a time. In such embodiments, if autonomous vehicle i is currently engaged in a first coordination group, it cannot join another coordination group until the first coordination group is released. In other embodiments, at least some autonomous vehicles can belong to more than one coordination group at a time. In one such embodiment, cooperative driving tasks requested on behalf of the first coordination group that the autonomous vehicle joins may have higher priority than cooperative driving tasks requested on behalf of any other coordination groups that the autonomous vehicle joins subsequent to joining the first coordination group until the first coordination group is released. In other embodiments, different prioritization policies may be applied when an autonomous vehicle belong to more than one coordination group.

Figure 5B:
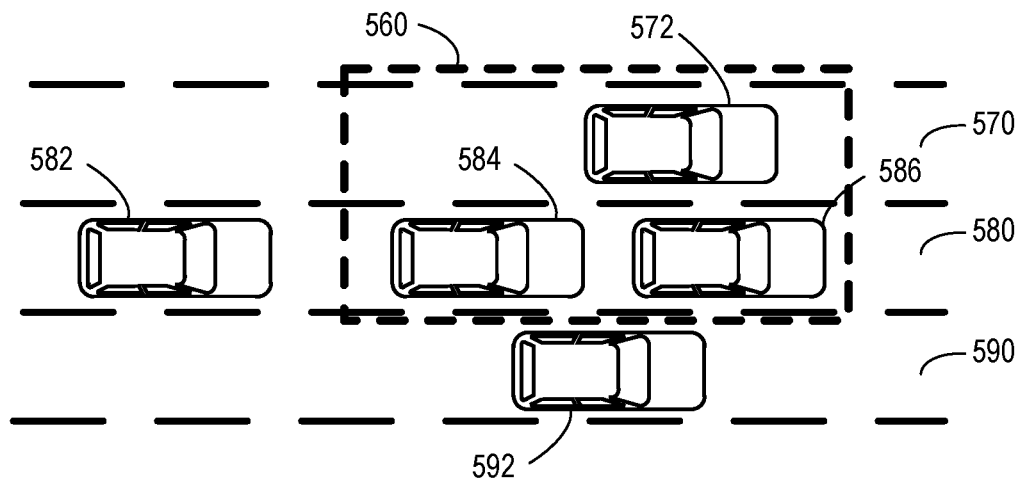
FIG. 5B illustrates an example traffic arrangement in which there are five autonomous vehicles traveling in three lanes, according to some embodiments.

FIG. 5B illustrates an example traffic arrangement in which there are five autonomous vehicles traveling in three lanes. These are shown as autonomous vehicle 582 in lane 580, autonomous vehicle 584 in lane 580, autonomous vehicle 572 in lane 570, autonomous vehicle 586 in lane 580, and autonomous vehicle 592 in lane 590.

In this example, it is assumed that autonomous vehicles 572 in lane 570, 586 in lane 580, and 592 in lane 590 are each traveling at the same maximum speed, while the autonomous vehicles 582 and 584 in lane 580 are not yet traveling at their respective maximum speeds. It is also assumed that the maximum speed of autonomous vehicles 572, 586, and 592 is lower than the maximum speed of autonomous vehicle 584 in lane 580. In the example traffic arrangement shown in FIG. 5B, in which autonomous vehicles 572, 586, and 592 have occupied all three lanes in front of autonomous vehicle 584 in lane 580 and are traveling at a maximum speed that is slower than the maximum speed of autonomous vehicle 584, autonomous vehicle 584, having no chance to accelerate to pass autonomous vehicles 572, 586, and 592 without cooperation from other vehicles, is identified as being in the deadlock condition. The driving condition of autonomous vehicles 572, 586, and 592, each of which is travelling at its respective maximum speed, is maximum, and the driving condition of vehicle 582 in lane 580, which is neither traveling at its respective maximum speed nor in a deadlock condition, is freerun.

In the illustrated example, in response to identifying autonomous vehicle 584 as being in deadlock condition, a coordination group 560 has been formed. Specifically, coordination group 560 includes the current vehicle 584 in lane 580 (which has been identified as being in the deadlock condition), front autonomous vehicle 586 in lane 580, and assistant autonomous vehicle 572 in adjacent lane 570. Hence, $G_{582}$=(freerun, free); $G_{584}$=(deadlock, busy); $G_{572}=G_{586}$=(maximum, busy); and $G_{592}$=(maximum, free). To resolve the deadlock condition for vehicle 584, an efficient cooperative autonomous driving strategy may be determined and implemented by the members of coordination group 560. In at least some embodiments, each autonomous vehicle may store, in its respective vehicle information store, along with any or all of the vehicle information elements described above in reference to FIG. 5A, the current driving status including the driving condition and coordination group status, for itself and for any autonomous vehicles from which it has obtained these additional vehicle information elements. For example, in some embodiments each autonomous vehicle may broadcast its current driving status along with any or all of the other vehicle information elements described herein at each time step. In other embodiments, the vehicle information broadcast and/or stored by each autonomous vehicle may include more, fewer, or different vehicle information elements.

Figure 5C:
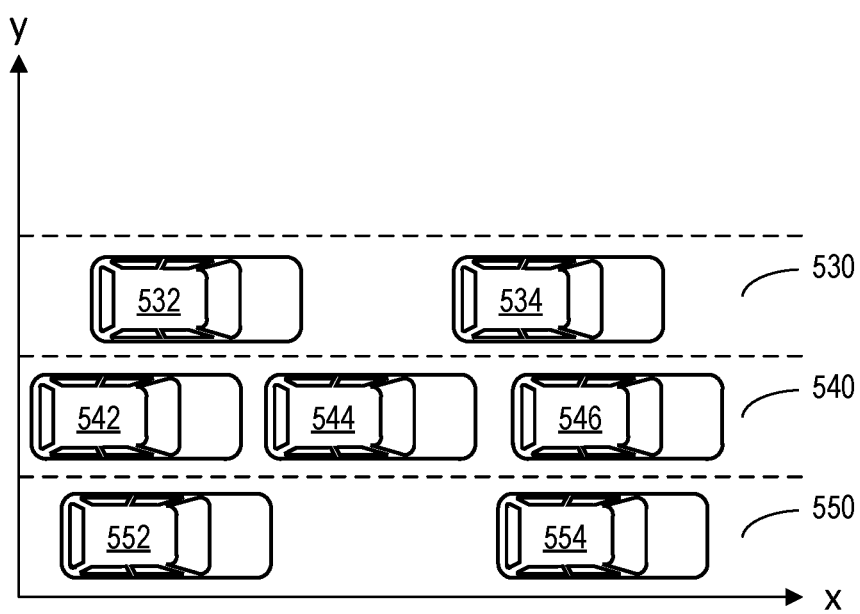
FIG. 5C illustrates an example traffic arrangement including seven autonomous vehicles having respective position-based designations, according to some embodiments.

In one example embodiment, vehicle information for at most seven autonomous vehicles may be stored in the information store within each autonomous vehicle at any given time. In this example, vehicle information may be stored for autonomous vehicles designated according to their positions relative to the autonomous vehicle on which the information is stored, if available, including:

- the current vehicle
- a front vehicle that is nearest to the current vehicle in the same lane and for which the relative center point coordinate values of the current vehicle and the front vehicle indicate that the front vehicle is traveling in front of the current vehicle
- a rear vehicle that is nearest to the current vehicle in the same lane and for which the relative center point coordinate values of the current vehicle and the rear vehicle indicate that the rear vehicle is traveling behind the current vehicle
- a left rear vehicle that is the nearest rear vehicle located in the adjacent lane to the left of the current vehicle
- a left front vehicle that is the nearest front vehicle located in the adjacent lane to the left of the current vehicle
- a right rear vehicle that is the nearest rear vehicle located in the adjacent lane to the right of the current vehicle
- a right front vehicle that is the nearest front vehicle located in the adjacent lane to the right of the current vehicle FIG. 5C illustrates an example traffic arrangement including autonomous vehicles having all seven of the designations listed above. In this example, autonomous vehicle 544 in lane 540 may be designated as the current vehicle and may store vehicle information associated with all seven autonomous vehicles depicted in FIG. 5C. The other autonomous vehicles include left rear vehicle 532 and left front vehicle 534 in lane 530, rear vehicle 542 and front vehicle 546 in lane 540, and right rear vehicle 552 and right front vehicle 554 in lane 550. In other embodiments, vehicle information may be stored in each current autonomous vehicle for more, fewer, or differently designated vehicles. For example, in some embodiments, vehicle information may also be stored in a current autonomous vehicle for a center left vehicle, a center right vehicle, and/or one or more additional vehicles farther from the current vehicle in the same lane as the current vehicle or in adjacent lanes. In some embodiments, vehicle information may be stored in each current autonomous vehicle for all other autonomous vehicles within a predetermined threshold distance of the current autonomous vehicle, regardless of their positions relative to the current autonomous vehicle or the lanes in which they are traveling. In some embodiments, after obtaining and storing vehicle information for a particular autonomous vehicle having one of the position-based designations listed above, if a different autonomous vehicle has moved into that position at a subsequent time step, the vehicle information previously stored for the particular autonomous vehicle may be discarded or otherwise replaced in the vehicle information store by vehicle information obtained from the different autonomous vehicle.

As noted above, step 1 of an ADC procedure may include an autonomous vehicle automatically determining, based on vehicle information obtained from other autonomous vehicles and/or stored in its vehicle information store, whether or not an autonomous vehicle is in the deadlock condition. In some embodiments, the autonomous vehicle may be considered to be in the deadlock condition when the autonomous vehicle satisfies three prerequisites at the same time. As a first prerequisite, the autonomous vehicle is following a front autonomous vehicle that is in its maximum condition. As a second prerequisite, the autonomous vehicle cannot change lanes nor accelerate to attain its maximum speed. As a third prerequisite, other vehicles that prevent the autonomous vehicle from changing lanes are in the maximum condition and have approximately the same maximum speed as the front autonomous vehicle.

FIG. 6 is a flow diagram illustrating selected elements of an example method for automatically detecting that an autonomous vehicle is in a deadlock condition, according to some embodiments. In some embodiments, some or all of the operations shown in FIG. 6 may be performed by a driving control system of the autonomous vehicle (such as driving control system 230 illustrated in FIG. 2) or by a group coordination subsystem thereof (such as group coordination subsystem 235 illustrated in FIG. 2). In the illustrated example, method 600 includes, at 602, a given autonomous vehicle beginning to exchange information with one or more neighboring autonomous vehicles using V2V communication. For example, the given autonomous vehicle may begin broadcasting and receiving vehicle information, as described above. Each autonomous vehicle may be executing a predefined respective driving plan and have a predetermined respective maximum speed. As described above, in some embodiments, the respective driving plans or maximum speeds for the given autonomous vehicle and/or the neighboring autonomous vehicles may be defined or determined based on user input, such as through human machine interface 220 illustrated in FIG. 2. In some embodiments, the respective maximum speeds of the autonomous vehicles may be user-specific, vehicle-type-specific, location- or region-specific, or system-wide default values or may be determined in accordance with a user-specific, vehicle-type-specific, location- or region-specific, or system-wide policy enforced by the cooperative autonomous driving system.

In the illustrated example, the method includes, at 604, the given autonomous vehicle moving forward and obtaining vehicle information from the one or more neighboring autonomous vehicles using V2V communication. In various embodiments, the vehicle information obtained may include any or all of the elements shown in FIGS. 5A and 5B, among other elements, and may be obtained from any number of neighboring autonomous vehicles, some of which may be associated with one of the position-based designations described above. If, at 606, it is determined that the given autonomous vehicle is traveling at its maximum speed, the method may return to 604. Otherwise, the method may continue to 608. If, at 608, it is determined that the given autonomous vehicle can accelerate from its current speed toward its maximum speed (e.g., that the given autonomous vehicle is not blocked from accelerating by an autonomous vehicle traveling in front of the given autonomous vehicle in the same lane), the method may proceed to 610. Otherwise, the method may continue to 612. At 610, the method may include the given autonomous vehicle accelerating from its current speed toward its maximum speed, after which the method returns to 604.

If, at 612, it is determined that the given autonomous vehicle can change lanes (e.g., that the given autonomous vehicle is not blocked from moving into an adjacent lane by autonomous vehicles in one or more adjacent lanes), the method may proceed to 614. Otherwise, the method may continue to 616. At 614, the method may include the given autonomous vehicle changing lanes, after which the method returns to 604. If, at 616, it is determined that the front autonomous vehicle and one or more other vehicles blocking the given autonomous vehicle are traveling at the same maximum speed (or similar maximum speeds) lower than the maximum speed of given autonomous vehicle, the method may continue to 618, where the deadlock condition is detected for the given autonomous vehicle. Otherwise, the method may return to 604.

Note that method 600 illustrated in FIG. 6 is an example embodiment and that in other embodiments, a method for automatically detecting that an autonomous vehicle is in a deadlock condition may include more, fewer, or different operations, including operations performed in an order different than that illustrated in FIG. 6. Also note that the operations illustrated in FIG. 6 may be repeated or performed continuously on each autonomous vehicle in an autonomous driving system to determine whether or not the autonomous vehicle is in the deadlock condition.

As noted above, step 2 of an ADC procedure may include forming a coordination group including the current vehicle, a front autonomous vehicle, and an assistant autonomous vehicle, where the current vehicle is the autonomous vehicle currently in the deadlock condition. The front autonomous vehicle is the autonomous vehicle followed by the current vehicle in the same lane. Forming the coordination group may include the current vehicle sending a coordination group request to the front autonomous vehicle. If the front autonomous vehicle does not belong to any other coordination groups (is 'free'), it may reply with a confirmation message to the current vehicle indicating that it is joining the coordination group. The front autonomous vehicle may ignore the coordination group request if it currently belongs to another coordination group (is 'busy'). The front autonomous vehicle may then request that an assistant autonomous vehicle join the same coordination group.

In some embodiments, the assistant autonomous vehicle may be the autonomous vehicle in an adjacent lane that is the shortest distance from the front autonomous vehicle. In other embodiments, the assistant autonomous vehicle may be determined based on other criteria or an applicable coordination group policy. For example, one coordination group policy may specify that the front autonomous should first request that an autonomous vehicle nearest to the front autonomous vehicle in the adjacent lane to its left join the coordination group. If the autonomous vehicle nearest to the front autonomous vehicle in the adjacent lane to its left is busy or is otherwise unable or unwilling to join the coordination group, the front autonomous vehicle may request that another autonomous vehicle in the adjacent lane to its left or an autonomous vehicle in the adjacent lane to its right join the coordination group. The coordination group is successfully formed when both the front autonomous vehicle and an assistant autonomous vehicle have joined the coordination group. The lane occupied by the assistant autonomous vehicle may be the target lane into which the front autonomous vehicle is tasked to change to resolve the deadlock condition.

FIG. 7 is a flow diagram illustrating selected elements of an example method for dynamically forming, and subsequently releasing, a coordination group using V2V communication, according to some embodiments. In some embodiments, when exchanging messages to form a coordination group, the autonomous vehicles may exchange unicast messages rather than broadcasting the message to and receiving the messages from multiple autonomous vehicles as described above. In some embodiments, some or all of the operations shown in FIG. 7 may be performed by a driving control system of a given autonomous vehicle that is in a deadlock condition (such as driving control system 230 illustrated in FIG. 2) or by a group coordination subsystem thereof (such as group coordination subsystem 235 illustrated in FIG. 2). In the illustrated example, method 700 includes, at 702, a given autonomous detects that it is a deadlock condition (e.g., as shown in FIG. 6). At 704, the method includes the given autonomous vehicle sending a coordination group request to an autonomous vehicle traveling in front of the given autonomous vehicle in the same lane.

If, at 706, it is determined that the front autonomous vehicle is already a member of a coordination group (e.g., that its coordination group status is 'busy'), the method may proceed to 708. Otherwise, the method may continue to 710. At 708, the method includes the front autonomous vehicle ignoring the coordination group request, after which the method proceeds to 718. At 710, the method includes the front autonomous vehicle confirming membership in the coordination group, which may include sending a coordination confirmation to the given autonomous vehicle.

At 712, the method includes the front autonomous vehicle sending an assistance request to an autonomous vehicle traveling in an adjacent lane (e.g., one that, due to its position relative to the given autonomous vehicle and the front autonomous vehicle might be able to assist in resolving the deadlock condition). If, at 714, it is determined that group coordination status of the autonomous vehicle in the adjacent lane is 'busy' (indicating that the autonomous vehicle in the adjacent lane is already a member of a different coordination group), the method continues at 716. Otherwise, the method proceeds to 720. If, at 716, it is determined that there is another autonomous vehicle in an adjacent lane (e.g., another autonomous vehicle in the same adjacent lane or in another adjacent lane that, due to its position relative to the given autonomous vehicle and the front autonomous vehicle might be able assist in resolving the deadlock condition), the method may return to 712, after which the operations shown as 712-716 may be repeated, as appropriate, for the other autonomous vehicle. If, or once, there are no other autonomous vehicles in adjacent lanes that might be able to assist in resolving the deadlock condition, the method may proceed to 718.

At 718, if it is determined that the given autonomous vehicle is still in a deadlock condition, the method may return to 704, after which the operations shown as 704-718 may be repeated, as appropriate, to attempt to resolve the deadlock condition. If, at 718, if it is determined that the given autonomous vehicle is no longer in a deadlock condition, the method may include waiting until another deadlock condition is detected before proceeding, as shown in FIG. 7.

At 720, in response to determining (at 714) that a vehicle in an adjacent lane is available to assist in resolving the deadlock condition, the method may include the autonomous vehicle in the adjacent lane sending a message to the front autonomous vehicle confirming its assistance, completing the formation of the coordination group. As described in more detail herein, at this point, the given autonomous vehicle may initiate actions by the coordination group members to resolve the deadlock condition (not shown). At 722, subsequent to successfully completing the formation of the coordination group, the method may include the given autonomous vehicle monitoring its own vehicle information and driving conditions, as well as vehicle information and driving conditions obtained from its neighbors, to determine whether the given autonomous vehicle is still in the deadlock condition. If so, the method may include waiting for the deadlock condition to be resolved before proceeding. Once the given autonomous vehicle is no longer in the deadlock condition (e.g., once the deadlock condition is resolved), the method may include the given autonomous vehicle releasing the coordination group, as in 724. This may include a further exchange of messages between the autonomous vehicles in the coordination group (not shown). One example of the messages exchanged between autonomous vehicles to form a coordination group, cooperate to resolve a deadlock condition, and release the coordination group is illustrated in FIG. 8 and described below.

Note that method 700 illustrated in FIG. 7 is an example embodiment and that in other embodiments, a method for dynamically forming, and subsequently releasing, a coordination group using V2V communication may include more, fewer, or different operations, including operations performed in an order different than that illustrated in FIG. 7.

In the example embodiment illustrated in FIG. 7, it is assumed that an autonomous vehicle can be controlled in at most one coordination group at a time. In other embodiments, a vehicle might be able to be a member of more than one coordination group at a same time.

As noted above, step 3 of an ADC procedure may include a current (deadlocked) autonomous vehicle initiating actions to be taken by the members of a coordination group to resolve the deadlock condition. This may include the current autonomous vehicle sending a cooperative driving task request to the front autonomous vehicle. For example, a cooperative driving task request may be sent to the front autonomous vehicle requesting that the front autonomous vehicle change lanes into the target lane, which is defined as the lane currently occupied by the assistant autonomous vehicle. The front autonomous vehicle may then temporarily modify its driving plan to help the current vehicle resolve the deadlock condition. This type of cooperative driving between the current autonomous vehicle and the front autonomous vehicle may be referred to as behavior coordination. In this example, after the current autonomous vehicle sends the lane change request to the front autonomous vehicle, the front autonomous vehicle may introduce the task 'change to the target lane' into its driving plan as a high priority task.

In order to change lanes, the front autonomous vehicle may need to have a higher speed than the assistant autonomous vehicle. Since the front autonomous vehicle is already traveling at its respective maximum speed, the front autonomous vehicle may send a cooperative driving task request to the assistant autonomous vehicle requesting that the assistant autonomous vehicle slow down to a certain speed to make enough space for the front autonomous vehicle to change lanes into the target lane. This cooperative speed adjustment between the front autonomous vehicle and the assistant autonomous vehicle may be referred to as speed negotiation.

Step 4 of an ADC procedure may include the current autonomous vehicle continuing to monitor information from nearby autonomous vehicles and releasing the coordination group once it has determined that the deadlock condition has been resolved. In some embodiments, to release the coordination group, the current autonomous vehicle may release itself from the coordination group (e.g., setting its group coordination status to 'free') and send a coordination group release message to the front autonomous vehicle indicating the release of the front autonomous vehicle from control by the coordination group. The front autonomous vehicle may, in turn, release itself from the coordination group (e.g., setting its group coordination status to 'free') and send a coordination group release to the assistant autonomous vehicle indicating the release of the assistant autonomous vehicle from control by the coordination group.

FIG. 8 illustrates example messages exchanged between autonomous vehicles in a coordination group in order to form the coordination group, cooperate to resolve a deadlock condition, and release the coordination group, according to one embodiment. Specifically, FIG. 8 illustrates example messages exchanged between the members of coordination group 560 illustrated in FIG. 5B, including current autonomous vehicle 584, front autonomous vehicle 586, and assistant autonomous vehicle 572.

In the illustrated example, the messages exchanged between these three autonomous vehicles in order to form coordination group 560 include coordination request 802 (from current vehicle 584 to front vehicle 586), coordination confirmation 804 (from front vehicle 586 to current vehicle 584), assistance request 806 (from front vehicle 586 to assistant vehicle 572), and assistance confirmation 808 (from assistant vehicle 572 to front vehicle 586).

In this example, the messages exchanged between the three autonomous vehicles in order to implement an altruistic cooperative driving strategy to resolve the deadlock condition of current autonomous vehicle current vehicle 584 include front vehicle control setup 810 (from current vehicle 584 to front vehicle 586), front vehicle control confirmation 812 (from front vehicle 586 to current vehicle 584), front vehicle task information 814 (from current vehicle 584 to front vehicle 586) indicating a cooperative driving task to be performed by front vehicle 586, front vehicle task confirmation 816 (from front vehicle 586 to current vehicle 584), assistant vehicle control setup 818 (from front vehicle 586 to assistant vehicle 572), assistant vehicle control confirmation 820 (from assistant vehicle 572 to front vehicle 586), assistant vehicle task information 822 (from front vehicle 586 to assistant vehicle 572) indicating a cooperative driving task to be performed by assistant vehicle assistant vehicle 572, and assistant vehicle task confirmation 824 (from assistant vehicle 572 to front vehicle 586).

Following completion of the assigned cooperative driving tasks, additional messages may be exchanged including confirm assistant vehicle task completion 826 (from assistant vehicle 572 to front vehicle 586) and confirm front vehicle task completion 828 (from front vehicle 586 to current vehicle 584). Once completion of the assigned cooperative driving tasks has been confirmed, messages may be exchanged to cause the release of coordination group 560, including release front vehicle control 830 (from current vehicle 584 to front vehicle 586), release assistant vehicle control 832 (from front vehicle 586 to assistant vehicle 572), confirm assistant vehicle release 834 (from assistant vehicle 572 to front vehicle 586), and confirm front vehicle release 836 (from front vehicle 586 to current vehicle 584).

The messages illustrated in FIG. 8 are example messages, according to one embodiment. In other embodiments or under different circumstances, more, fewer, or different message may be exchanged between the current vehicle and the front autonomous vehicle and/or between the front autonomous vehicle and the assistant autonomous vehicle. In some embodiments, when forming a coordination group, initiating actions to be taken to resolve a deadlock condition, and/or releasing a coordination group, the autonomous vehicles may exchange unicast messages rather than broadcasting the message to and receiving the messages from multiple autonomous vehicles as described above.

Figure 9:
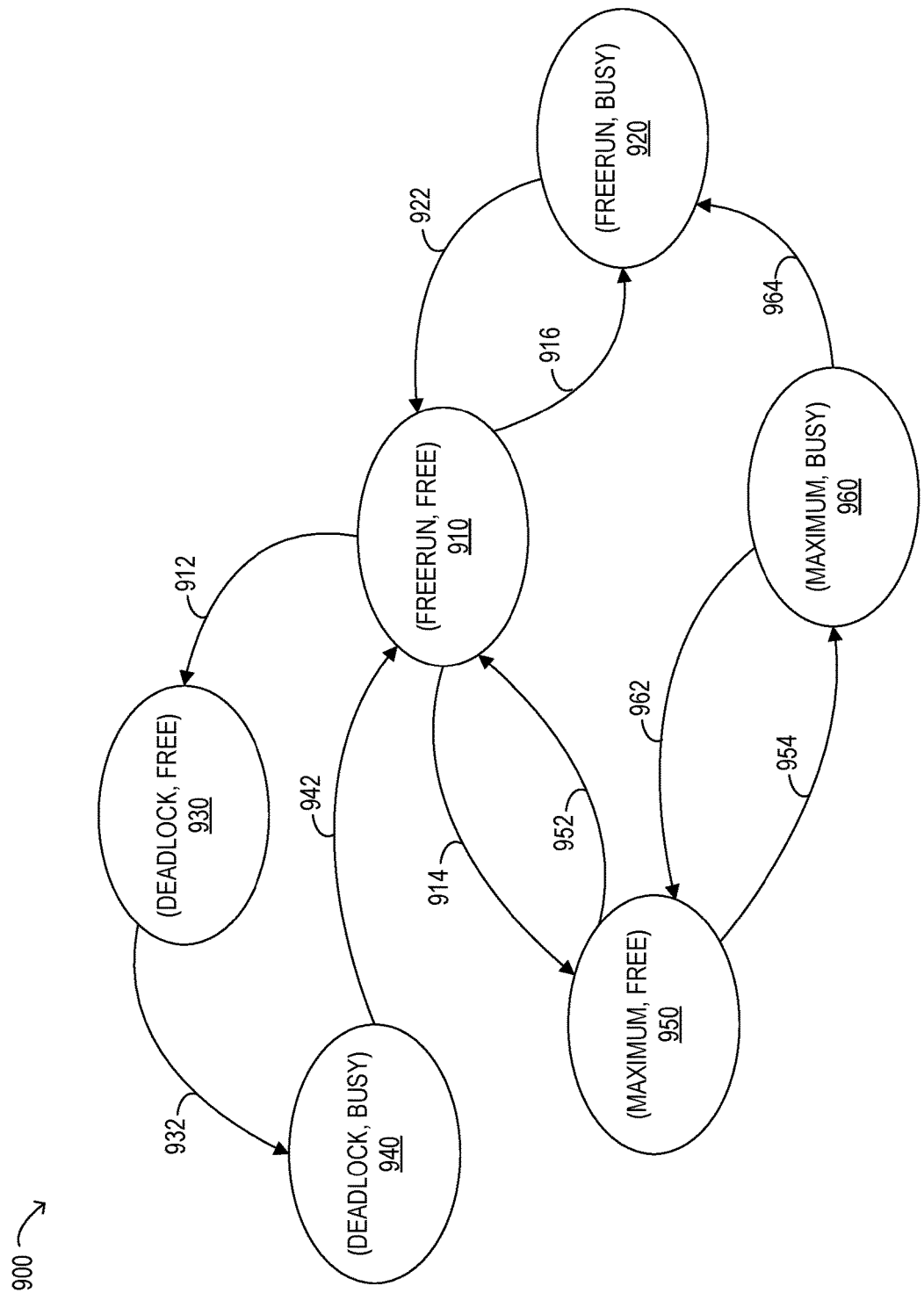
FIG. 9 is a state diagram 900 illustrating how the current driving status of an autonomous vehicle changes in response to certain triggering conditions, according to some embodiments.

FIG. 9 is a state diagram 900 illustrating how, in some embodiments, the current driving status of an autonomous vehicle that performs cooperative autonomous driving for traffic congestion avoidance through vehicle-to-vehicle communications changes in response to certain triggering conditions. In state diagram 900, it is assumed that an autonomous vehicle is always in one of six states, each corresponding to a respective current driving status tuple, as follows:

state 910 (freerun, free), in which the autonomous vehicle is neither deadlocked nor operating at its maximum speed and is not currently controlled as a member of a coordination group state 920 (freerun, busy), in which the autonomous vehicle is neither deadlocked nor operating at its maximum speed and is currently controlled as a member of a coordination group state 930 (deadlock, free), in which the autonomous vehicle is deadlocked and is not currently controlled as a member of a coordination group state 940 (deadlock, busy) in which the autonomous vehicle is deadlocked and is currently controlled as a member of a coordination group state 950 (maximum, free) in which the autonomous vehicle is operating at its maximum speed and is not currently controlled as a member of a coordination group state 960 (maximum, busy) in which the autonomous vehicle is operating at its maximum speed and is currently controlled as a member of a coordination group In state diagram 900, transition 912 from state 910 to state 930 may be triggered by detecting a deadlock condition for the autonomous vehicle. Transition 932 from state 930 to state 940 may be triggered by the formation of a coordination group by the autonomous vehicle, which is the current (deadlocked) vehicle. Transition 942 from state 940 to state 910 may be triggered when a deadlock condition for the autonomous vehicle is resolved and the coordination group that resolved the deadlock condition is released. Transition 914 from state 910 to state 950 may be triggered when the autonomous vehicle accelerates to its maximum speed (with or without also changing lanes). Transition 952 from state 950 to state 910 may be triggered when the autonomous vehicle reduces its speed other than as part of cooperative effort to resolve a deadlock condition. Transition 954 from state 950 to state 960 may be triggered by the autonomous vehicle joining coordination group (e.g., as a front autonomous vehicle or as an assistant autonomous vehicle in the coordination group). Transition 962 from state 960 to state 950 may be triggered by the release of a coordination group of which the autonomous vehicle is a member (as either the front vehicle or the assistant vehicle) where the autonomous vehicle did not reduce its speed as part of resolving a deadlock condition for another autonomous vehicle. Transition 964 from state 960 to state 920 may be triggered when the autonomous vehicle reduces its speed (e.g., as part of cooperative effort to resolve a deadlock condition). Transition 916 from state 910 to state 920 may be triggered when the autonomous vehicle joins a coordination group (as either the front vehicle or the assistant vehicle) but is not traveling at its maximum speed. Finally, transition 922 from state 920 to state 910 may be triggered when a coordination group of which the autonomous vehicle is a member (as either the front vehicle or the assistant vehicle) is released but the autonomous vehicle is not traveling at it maximum speed.

In some embodiments, not all of the transitions illustrated in FIG. 9 and described above may be implemented in the cooperative driving system. In some embodiments, not all of the transitions illustrated in FIG. 9 and described above may be allowed, according to applicable user-specific, vehicle-type-specific, location- or region-specific, or system-wide polices enforced by the cooperative autonomous driving system.

In various embodiments, two specific cases in which to apply speed negotiation between the front autonomous vehicle and the assistant autonomous vehicle may be encountered, as follows:

Case 1: If there is no vehicle in front of the assistant autonomous vehicle, the assistant autonomous vehicle may be asked to decelerate to a speed lower than the speed of the front autonomous vehicle.

Case 2: If there is a vehicle in front of the assistant autonomous vehicle, the front autonomous vehicle may be asked to decelerate to a speed lower than the speed of the autonomous vehicle in front of the assistant autonomous vehicle, and the assistant autonomous vehicle may be asked to decelerate to a speed lower than the speed of the front autonomous vehicle.

In at least some embodiments, it may be assumed that $V_{front}$ is the speed of the front autonomous vehicle, $V_{assist}$ is the speed of the assistant autonomous vehicle, and $V_{ff}$ is the speed of the autonomous vehicle in front of the assistant autonomous vehicle. In order to allow the front autonomous vehicle to change lanes into the target lane, the speed relationship can be formalized as follows:

$$V_{assist} < V_{front} \qquad \text{Case 1:}$$

$$V_{assist} < V_{front} < V_{ff} \qquad \text{Case 2:}$$

Through speed negotiation, the front autonomous vehicle may be guaranteed to be able to change lanes into the target lane after a short period of time. In one example, the guidelines shown in following Table 1 may be used to assign the speeds for the front autonomous vehicle and the assistant autonomous vehicle in the two cases described above.

TABLE 1

Speed Negotiation

| Vehicle | Speed in Case 1 | Speed in Case 2 |
|---|---|---|
| Assistant Vehicle | $\dfrac{V_{front}}{2}$ | $\dfrac{V_{ff}}{3}$ |
| Front Vehicle | $V_{front}$ | $\dfrac{V_{ff}}{2}$ |

In the example illustrated in Table 1, $V_{front}$ is the speed of the front autonomous vehicle, and $V_{ff}$ is the speed of the autonomous vehicle in front of the assistant autonomous vehicle. In Case 1, the front autonomous vehicle maintains it current speed of $V_{front}$, and a speed equal to one half of $V_{front}$ is assigned to the assistant autonomous vehicle. In Case 2, a speed equal to one third of $V_{ff}$ is assigned to the assistant autonomous vehicle and a speed equal to one half of $V_{ff}$ is assigned to the front autonomous vehicle. In these examples, the front autonomous vehicle may be guaranteed to be able to change lanes into the target lane after a short period of time through the speed negotiation. Subsequent to the front autonomous vehicle completing its lane change maneuver, the current (deadlocked) autonomous vehicle may have enough space to accelerate toward its maximum speed and eventually overtake the front autonomous vehicle and the assistant autonomous vehicle, thus escaping the deadlock condition.

Figure 10A:
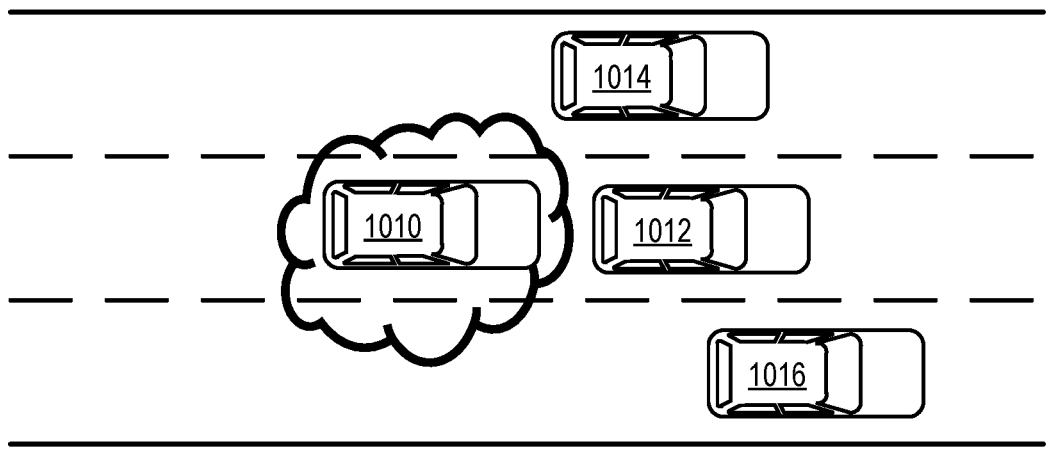
FIGS. 10A-10F illustrate an example scenario in which a deadlock condition is resolved through cooperative autonomous driving.

FIGS. 10A-10F illustrate an example scenario in which a deadlock condition in accordance with case 1 described above is resolved through cooperative autonomous driving. Specifically, FIG. 10A illustrates a scenario in which a deadlock condition is identified for autonomous vehicle 1010, which is blocked from attaining its maximum speed by autonomous vehicle 1012 and by autonomous vehicles 1014 and 1016. Autonomous vehicle 1012 is traveling at its maximum speed (which is lower than the maximum speed of autonomous vehicle 1010) in front of autonomous vehicle 1010 in the same lane. Autonomous vehicles 1014 and 1016 are traveling at their respective maximum speeds (which are the same as or similar to the maximum speed of autonomous vehicle 1012) in respective adjacent lanes.

Figure 10B:
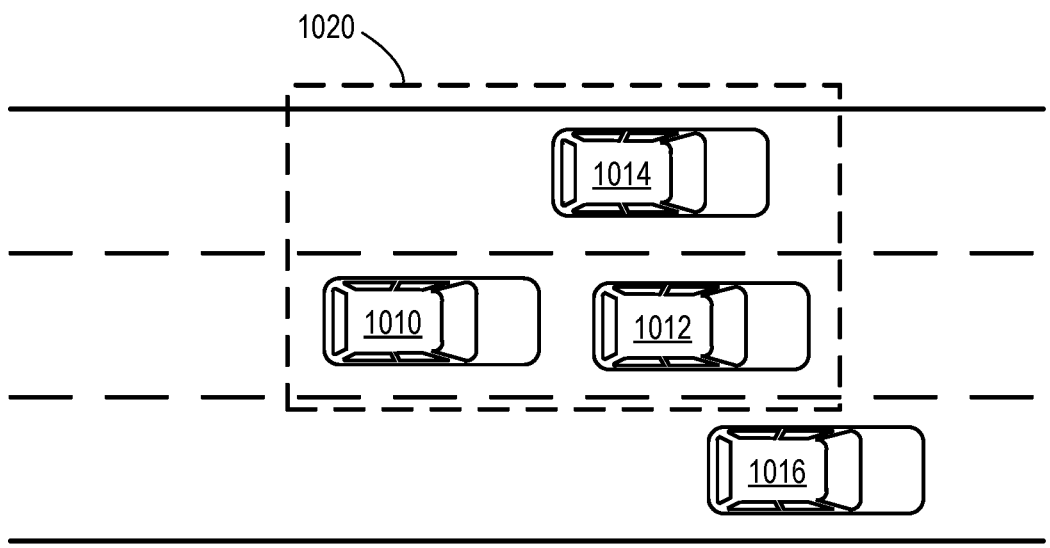

FIG. 10B illustrates a coordination group 1020 formed to resolve the deadlock condition for autonomous vehicle 1010. Coordination group 1020 includes deadlocked autonomous vehicle 1010, front autonomous vehicle 1012, and assistant autonomous vehicle 1014. In another embodiment, a coordination group formed to resolve the deadlock condition for autonomous vehicle 1010 might have included assistant autonomous vehicle 1016 instead of assistant autonomous vehicle 1014 (e.g., if autonomous vehicle 1014 was already busy or if autonomous vehicle 1016 was preferred according to an applicable coordination group policy).

Figure 10C:
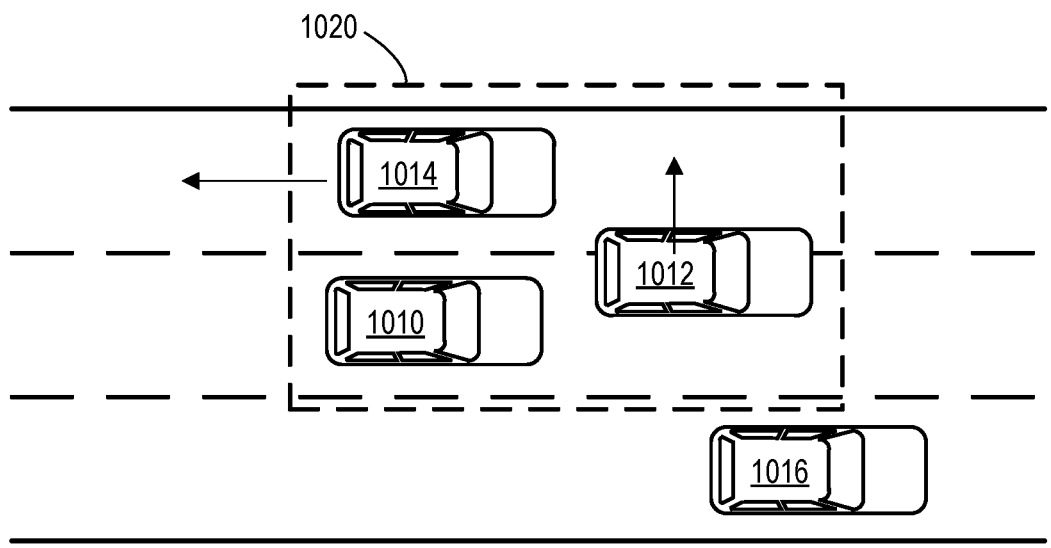

FIG. 10C illustrates that, subsequent to the formation of coordination group 1020, the autonomous vehicles in coordination group 1020 begin to take cooperative actions to resolve the deadlock condition, including autonomous vehicle 1012 changing lanes to allow autonomous vehicle 1010 to escape the deadlock condition. Specifically, FIG. 10C illustrates that autonomous vehicle 1014 reduces its speed to create a gap into which autonomous vehicle 1012 can change lanes, after which autonomous vehicle 1012 begins moving into the target lane.

Figure 10D:
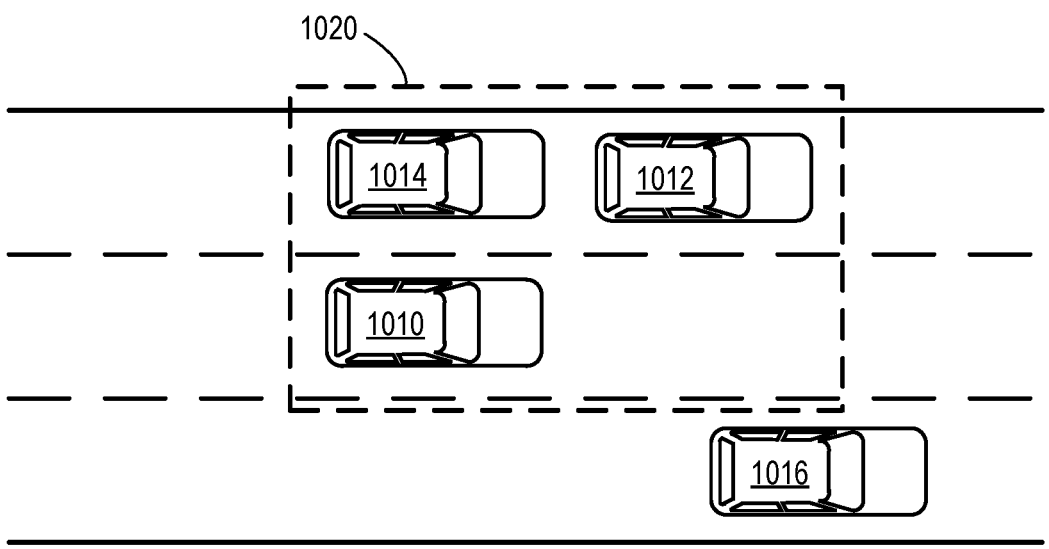

FIG. 10D illustrates the point at which autonomous vehicle 1012 has completed its lane change.

Figure 10E:
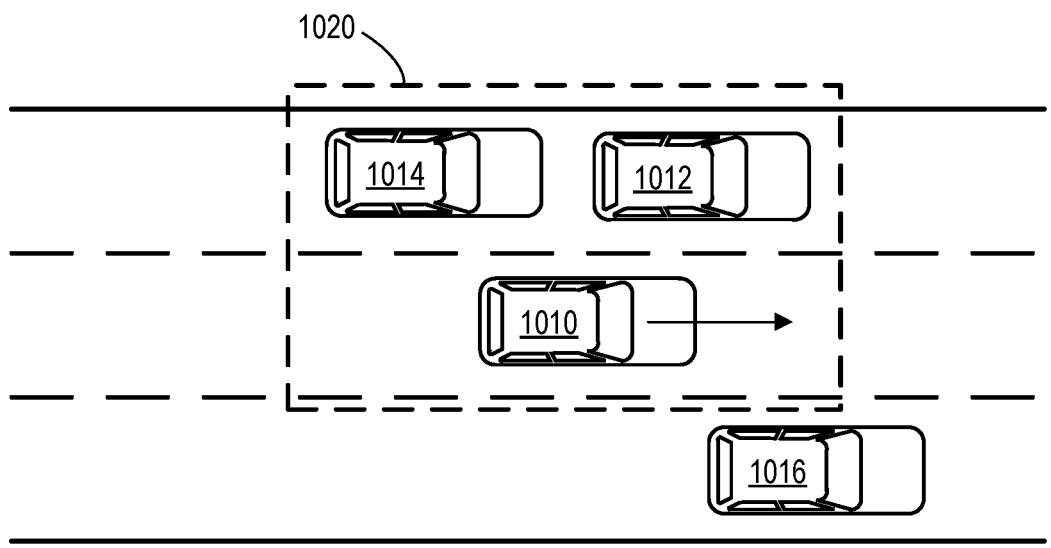

FIG. 10E illustrates that, since autonomous vehicle 1012 is no longer blocking its path, autonomous vehicle 1010 can accelerate toward its maximum speed, eventually overtaking autonomous vehicle 1012 and, potentially, autonomous vehicle 1016.

Figure 10F:
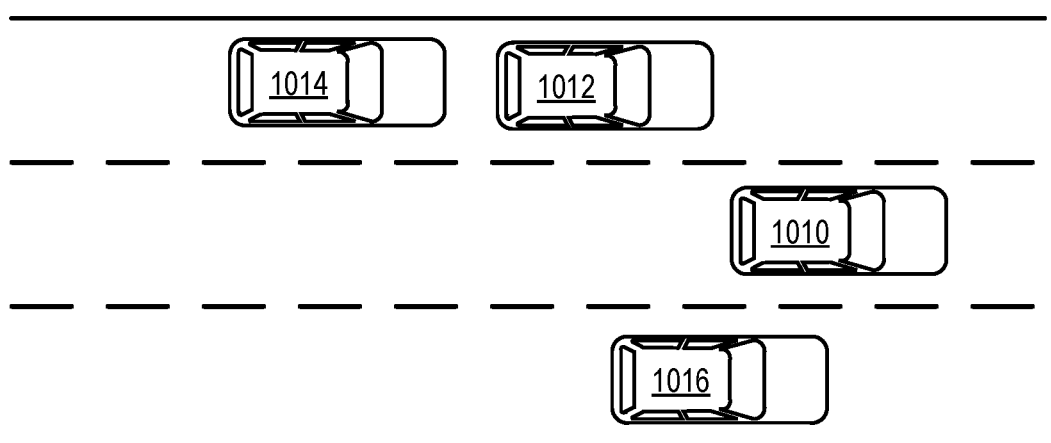

FIG. 10F illustrates that, in response to the deadlock condition being resolved, autonomous vehicle 1010 has released coordination group 1020, as described herein.

Figure 11A:
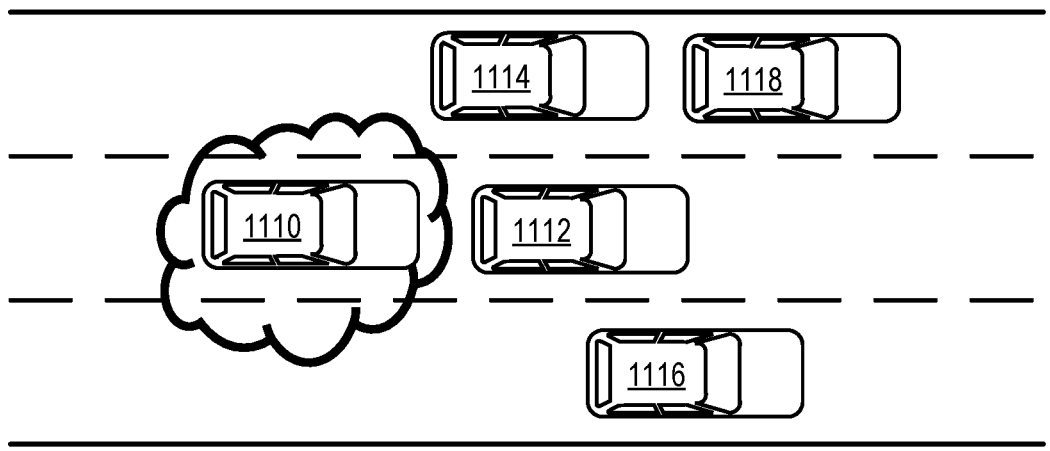
FIGS. 11A-11F illustrate another example scenario in which a deadlock condition is resolved through cooperative autonomous driving.

FIGS. 11A-11F illustrate an example scenario in which a deadlock condition in accordance with case 2 described above is resolved through cooperative autonomous driving. Specifically, FIG. 11A illustrates a scenario in which a deadlock condition is identified for autonomous vehicle 1110, which is blocked from attaining its maximum speed by at least autonomous vehicle 1112 in its own lane and by autonomous vehicles 1114 and 1116 in adjacent lanes. In this example, autonomous vehicle 1112 is traveling at its maximum speed (which is lower than the maximum speed of autonomous vehicle 1110) in front of autonomous vehicle 1110 in the same lane. Autonomous vehicles 1114 and 1116 are traveling at their respective maximum speeds (which are the same as or similar to the maximum speed of autonomous vehicle 1112) in their respective adjacent lanes. In addition, autonomous vehicle 1118 is travelling in front of autonomous vehicle 1114 in the same lane as autonomous vehicle 1114.

Figure 11B:
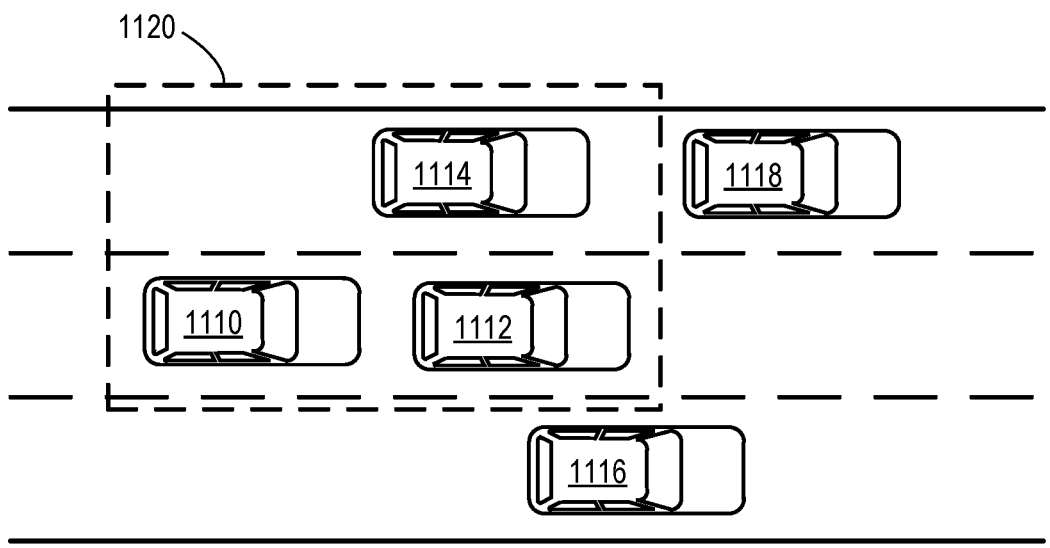

FIG. 11B illustrates a coordination group 1120 formed to resolve the deadlock condition for autonomous vehicle 1110. Coordination group 1120 includes current (deadlocked) autonomous vehicle 1110, front autonomous vehicle 1112, and assistant autonomous vehicle 1114. In another embodiment, coordination group 1120 might have included assistant autonomous vehicle 1116 instead of assistant autonomous vehicle 1114 (e.g., if autonomous vehicle 1114 was already busy or if autonomous vehicle 1116 was preferred according to an applicable coordination group policy).

Figure 11C:
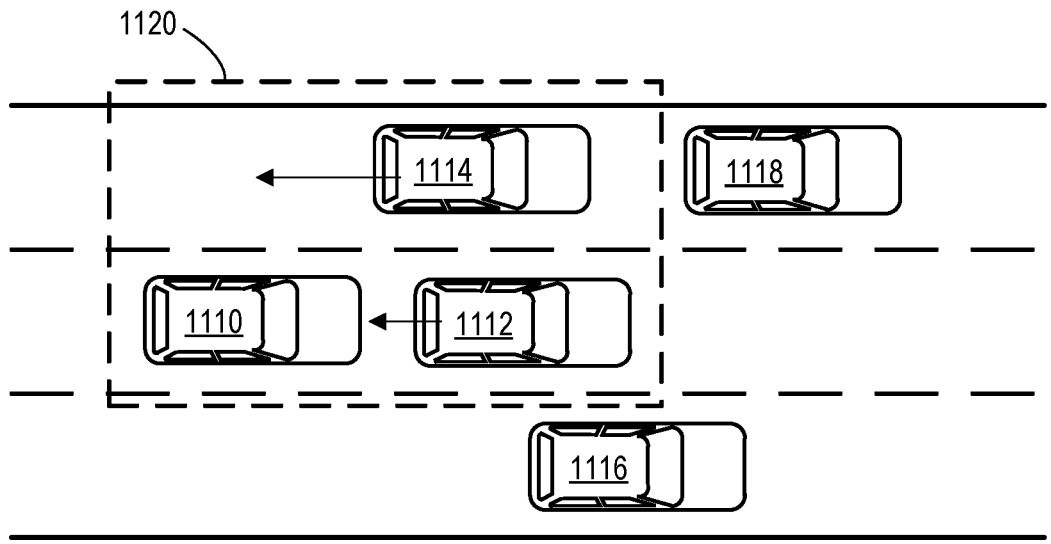

FIG. 11C illustrates that, subsequent to the formation of coordination group 1120, the autonomous vehicles in coordination group 1120 begin to take cooperative actions to resolve the deadlock condition, including front autonomous vehicle 1112 changing lanes to allow current autonomous vehicle 1110 to escape the deadlock condition. Because autonomous vehicle 1118 is traveling in front of assistant autonomous vehicle 1114, before autonomous vehicle 1112 can change lanes, not only does assistant autonomous vehicle 1114 need to reduce its speed, but front autonomous vehicle 1112 also needs to reduce its speed. In this example, front autonomous vehicle 1112 reduces its speed to a speed slower than the speed of autonomous vehicle 1118, and assistant autonomous vehicle 1114 reduces its speed to a speed slower than the reduced speed of front autonomous vehicle 1112.

Figure 11D:
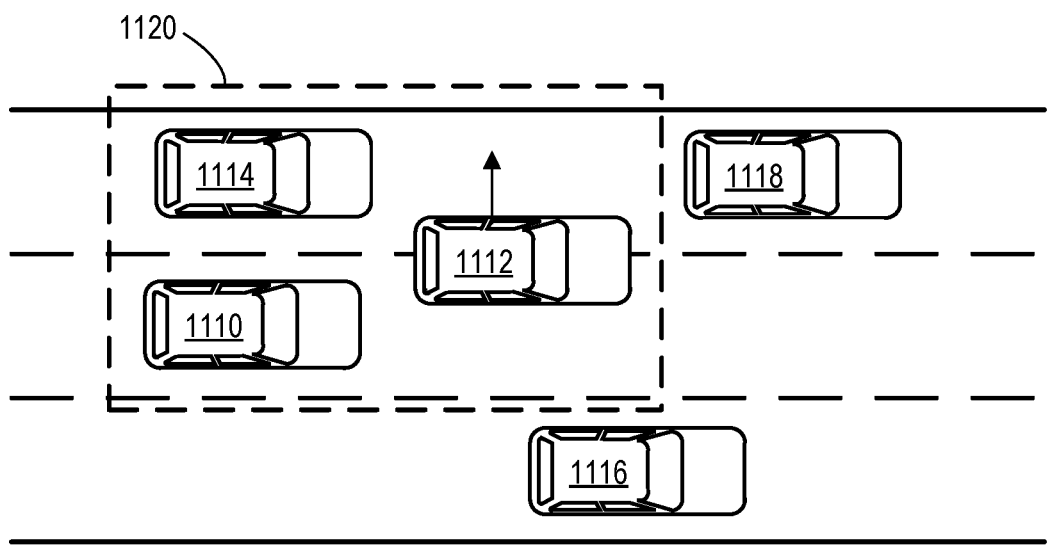

FIG. 11D illustrates that, once there is a sufficient gap between assistant autonomous vehicle 1114 and autonomous vehicle 1118 to allow front autonomous vehicle 1112 to change lanes, front autonomous vehicle 1112 begins moving into the target lane.

Figure 11E:
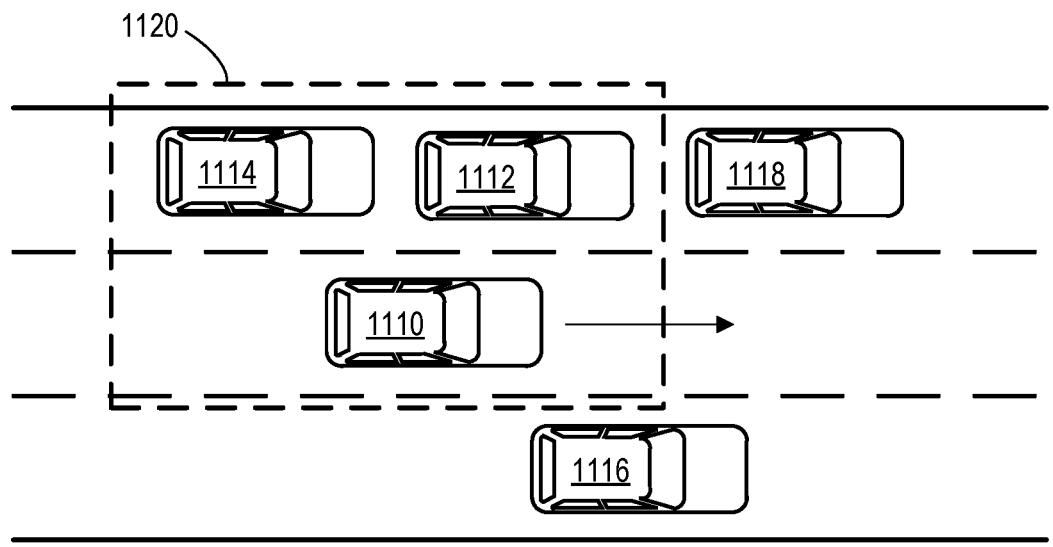

FIG. 11E illustrates that, once front autonomous vehicle 1112 completes its lane change, autonomous vehicle 1112 is no longer blocking the path of current autonomous vehicle 1110. Therefore, current autonomous vehicle 1110 can accelerate toward its maximum speed, eventually overtaking autonomous vehicles 1112 and 1118 (and, potentially, autonomous vehicle 1116).

Figure 11F:
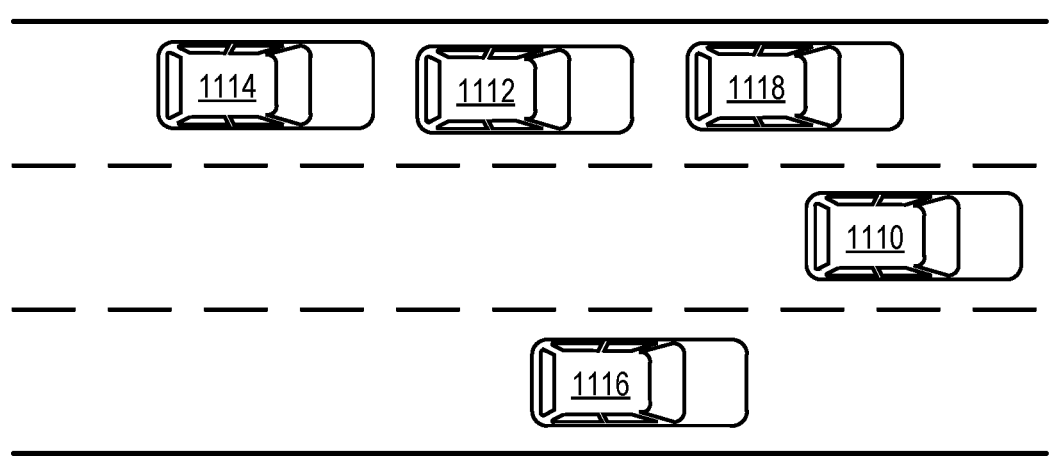

FIG. 11F illustrates that, in response to the deadlock condition being resolved, autonomous vehicle 1110, which has overtaken autonomous vehicles 1112, 1118, and 1116, has released coordination group 1120, as described herein.

The disclosed cooperative driving strategy named Altruistic Cooperative Driving was simulated and evaluated using a microscopic traffic simulation. The simulation confirmed that this cooperative autonomous driving strategy can successfully resolve congestion conditions in most cases. The simulation also quantitatively confirmed that this cooperative autonomous driving strategy can improve Velocity Efficiency by up to 15% when compared to autonomous driving strategies without V2V communication.

The Java™ programming language was used to design a traffic simulator in which different types of vehicles were simulated driving on a multi-lane road. In the microscopic traffic simulation, the road supported bidirectional traffic and the number of lanes could be dynamically configured. In the microscopic traffic simulation, four different types of vehicles were randomly generated, each of which had different specifications and performance (e.g., maximum speed, maximal acceleration, and maximal deceleration, etc.). In one implementation of the simulation, a mix ratio among the four types of vehicles was 1:1:1:1, and the ranges of maximum speed, maximal acceleration, and maximal deceleration were [40 km/h, 100 km/h], [9 km/h/s, 12 km/h/s], and [30 km/h/s, 33 km/h/s], respectively.

The autonomous vehicles in the microscopic traffic simulation obeyed a predefined vehicle-following model and a predefined lane-changing model. Additionally, two driving modes were used for the autonomous vehicles in the microscopic traffic simulation: 'autonomous driving' and 'altruistic cooperative driving'. For the 'autonomous driving' mode, vehicles managed driving maneuvers based on selfadaptive intelligence alone (e.g., based only on local intelligence), because it was assumed that no V2V communication capability was available. In contrast, based on V2V communication technology, vehicles using the 'altruistic cooperative driving' mode were able to communicate with each other to form coordination groups and execute cooperative driving to avoid traffic congestion.

In the simulation, an average speed efficiency (ASE) of all autonomous vehicles was used to measure traffic efficiency. The speed efficiency of each autonomous vehicle is equal to the actual average speed efficiency of the vehicle divided by the respective maximum speed of the vehicle. For example, if an autonomous vehicle drives at its respective maximum speed all the time, the speed efficiency of that autonomous vehicle is equal to 1. Equation 1 below was used to calculate the ASE of autonomous vehicles.

$$ASE = \frac{\sum_{i=1}^{N} \frac{A_i}{M_i}}{N} \quad \text{Equation 1}$$

In Equation 1, N represents the total number of autonomous vehicles, $A_i$ represents an actual average speed for a vehicle i, and $M_i$ represents the maximum speed for vehicle i. A total of 10,000 vehicles were evaluated per simulation run, making N is equal to 10,000. The speed efficiencies of the ACD and autonomous driving modes under different number of lanes and traffic loads were compared to each other. The speed efficiency for ACD was found to be higher than for autonomous driving under all conditions, with up to a 15% improvement for some cases. The increase in speed efficiency is due, in large part, to the fact that vehicles using ACD can establish coordination groups and can enable cooperative driving to resolve deadlock conditions in a timely fashion, thus reducing the duration of traffic slowdowns and the occurrence of traffic congestion. Furthermore, for the same driving strategy, when there were more lanes in the road, the speed efficiency increased. This is because the existence of more lanes provides a higher speed vehicle with more opportunities to change lanes to avoid traffic congestion when lower speed vehicles are blocking lanes ahead of the higher speed vehicle.

In the simulation, it was assumed that messages exchanged through V2V communication were 1 MB in size and that the message exchange interval (e.g., the time step period) was 10 milliseconds for all autonomous vehicles. The average communication traffic for each vehicle was calculated based on driving one kilometer. It was observed that a vehicle may generate more network traffic when there are more lanes in the road. This is because there are additional neighbor vehicles traveling in the additional lanes. The results of the simulation suggest that the proposed cooperative driving strategy can be supported with a moderate level of V2V communication traffic (e.g., on the order of several GB per km per vehicle). It is believed that the network communication traffic statistics generated by the simulation will be a useful reference for designing vehicular network equipment in the near future.

Figure 12:
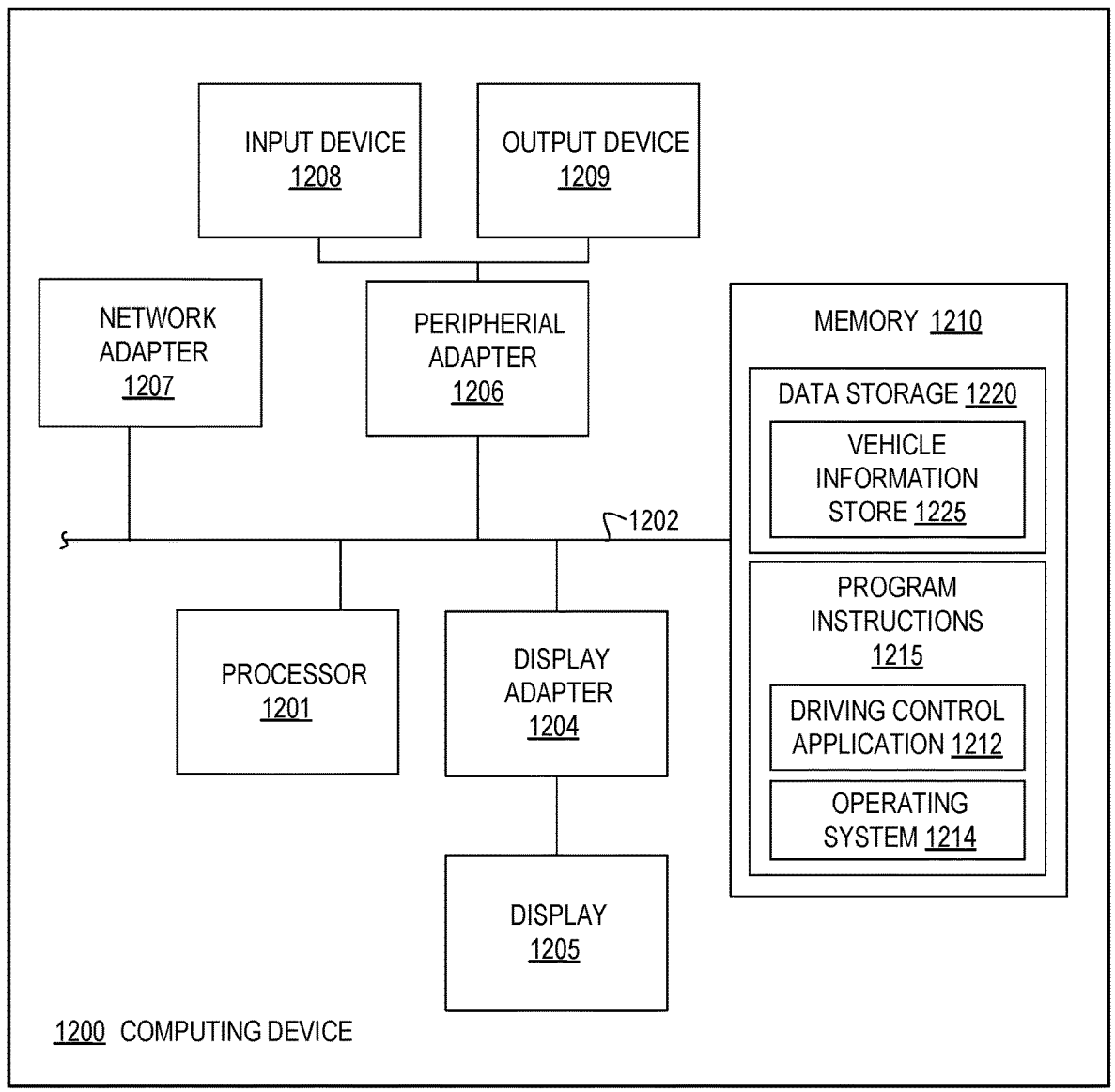
FIG. 12 is a block diagram illustrating selected elements of an example computing device 1200, according to some embodiments.

Referring now to FIG. 12, a block diagram illustrating selected elements of an example computing device 1200 is presented. Computing device 1200 may represent electronic components and software included in a vehicle to implement the methods and systems described herein for cooperative autonomous driving for traffic congestion avoidance through vehicle-to-vehicle communications. Accordingly, computing device 1200 may represent various components and systems used in an autonomous vehicle. An autonomous vehicle, as referred to herein, is a vehicle that can operate (e.g., to accelerate, brake, steer, decelerate, and perform combinations thereof) and thereby travel on roads to a predetermined destination location without direct intervention by a human driver. In certain implementations, computing device 1200 may be used with non-autonomous vehicles. For example, in some embodiments, each connected autonomous vehicle in a system for cooperative autonomous driving for traffic congestion avoidance through vehicle-to-vehicle communications may include a respective instance of computing device 1200. Although the above description is presented in terms of V2V communications among autonomous vehicles, it will be understood that the communications may be used with vehicles operated by a human driver, such that the communications are received by a human driver, who is tasked with performing the commensurate driving actions, such as decelerating, changing lanes, etc.

In the embodiment depicted in FIG. 12, computing device 1200 includes processor 1201 coupled via shared bus 1202 to storage media collectively identified as memory 1210. Computing device 1200, as depicted in FIG. 12, further includes network adapter 1207 that interfaces computing device 1200 to a network (not shown in FIG. 12). In embodiments suitable for cooperative autonomous driving for traffic congestion avoidance through vehicle-to-vehicle communications, network adapter 1207 may support various wireless network interfaces for V2V communications, such as peer-peer networking among vehicles, or various types of client-server networking using local or wide area wireless networking interfaces. Thus, network adapter 1207 may implement the functionality of wireless communication system 240 illustrated in FIG. 2. In some embodiments in which computing device 1200 implements V2V communication, external infrastructure, such as road side units or cellular base stations, may be supported by network adapter 1207 for V2V communications.

Computing device 1200, as depicted in FIG. 12, may also include peripheral adapter 1206, which provides connectivity for the use of input device 1208 and output device 1209. Input device 1208 may represent a device for user input, such as a keyboard or a mouse, a touch panel, a microphone, or a camera, among others. Output device 1209 may represent a device for providing signals or indications to a user, such as loudspeakers for generating audio signals, among others. Collectively, peripheral adapter 1206, input device 1208, and output device 1209 may implement the functionality of human machine interface 220 illustrated in FIG. 2.

Computing device 1200 is shown in FIG. 12 including display adapter 1204 and further includes a display device shown as display 1205. Display adapter 1204 may interface shared bus 1202, or another bus, with an output port for one or more displays, such as display 1205. Display 1205 may be implemented as a liquid crystal display screen, a computer monitor, a television or the like. Display 1205 may comply with a display standard for the corresponding type of display. Standards for computer monitors include analog standards such as VGA, XGA, etc., or digital standards such as DVI, HDMI, among others. A television display may comply with standards such as NTSC (National Television System Committee), PAL (Phase Alternating Line), or another suitable standard. Display 1205 may include an output device 1209, such as one or more integrated speakers to play audio content, or may include an input device 1208, such as a microphone or video camera or touch panel, in various implementations.

In some embodiments, memory 1210 may encompass persistent and/or volatile media, fixed and/or removable media, and magnetic and/or semiconductor media. Memory 1210 includes computer-readable memory media operable to store instructions, data, or both. For example, memory 1210 includes data storage 1220, which includes vehicle information store 1225. Vehicle information store 1225 may be similar to vehicle information store 250 illustrated in FIG. 2. Memory 1210 also includes program instructions 1215 which, as shown, includes sets or sequences of instructions, namely, an operating system 1214, and driving control application 1212. Operating system 1214 may be a UNIX or UNIX-like operating system, a Windows® family operating system, or another suitable operating system. Driving control application 1212 may implement the functionality of driving control system 230 illustrated in FIG. 2, including group coordination subsystem 235. For example, when executed by processor 1201, driving control application 1212 may be operable to perform identifying a deadlock condition of the autonomous vehicle on which it is operating, initiate the formation of a coordination group, initiate the performance of actions by the members of the coordination group to resolve the deadlock condition, and release the coordination group in response to the resolution of the deadlock condition.

The systems and methods described herein may address the problem of cooperative driving for connected autonomous vehicles to avoid traffic congestion. As described herein, to avoid traffic congestion, autonomous vehicles may be provided with intelligence to determine certain optimal driving strategies including timing of acceleration and deceleration, and how to execute a lane change. The connected autonomous vehicles may communicate with each other through vehicle-to-vehicle (V2V) communication to detect and collect surrounding vehicle information. This information may be stored by the autonomous vehicles and used to identify deadlock conditions that cause traffic slow down, and to determine multi-vehicle cooperative driving tasks to be performed to resolve deadlocks and improve overall traffic flow. The formation of coordination groups of connected autonomous vehicles and subsequent performance of cooperative driving strategies by the autonomous vehicles in the coordination groups may be realized through the exchange of messages, which may provide more control possibilities than the Cooperative Awareness Messages (CAM) approach used in a traditional vehicular adaptive cruise control system. By exchanging vehicle information as well as driving intentions, the connected autonomous vehicles in a coordination group may be able to prevent, reduce, or resolve traffic congestion conditions through effective cooperative driving strategies.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for traffic congestion avoidance using cooperative autonomous driving, comprising:
   automatically detecting, by a given autonomous vehicle in a plurality of autonomous vehicles each executing a respective driving plan and having a respective maximum speed representing a predetermined upper bound on a speed at which the autonomous vehicle is to travel, that the given autonomous vehicle is in a deadlock condition in which the given autonomous vehicle is blocked from reaching the given autonomous vehicle's respective maximum speed by autonomous vehicles in two or more lanes;
   initiating, by the given autonomous vehicle, formation of a coordination group comprising three of the plurality of autonomous vehicles, the three autonomous vehicles including the given autonomous vehicle, a front autonomous vehicle traveling in front of and in a same driving lane as the given autonomous vehicle, and an assistant autonomous vehicle traveling in a lane adjacent to the lane in which the given autonomous vehicle and the front autonomous vehicle are traveling; and
   sending, by the given autonomous vehicle using vehicle-to-vehicle communication, a cooperative driving task request to initiate actions by two or more autonomous vehicles in the coordination group to resolve the deadlock condition.

2. The method of claim 1, wherein automatically detecting that the given autonomous vehicle is in the deadlock condition comprises:
   obtaining, by each of the plurality of autonomous vehicles using vehicle-to-vehicle communication, respective vehicle information from one or more other autonomous vehicles within communication range including, for each of the other autonomous vehicles:
   a current speed of the other autonomous vehicle;
   the respective maximum speed of the other autonomous vehicle;
   a direction in which the other autonomous vehicle is traveling; and
   a current position of the other autonomous vehicle;
   determining, dependent on the respective vehicle information obtained from the one or more other autonomous vehicles, that the given autonomous vehicle is in the deadlock condition.

3. The method of claim 2, wherein determining, dependent on the respective vehicle information obtained from the one or more other autonomous vehicles, that the given autonomous vehicle is in the deadlock condition comprises:
   determining that the front autonomous vehicle is traveling at the front autonomous vehicle's respective maximum speed;
   determining that the assistant autonomous vehicle is traveling at the assistant autonomous vehicle's respective maximum speed;
   determining that the respective maximum speed of the front autonomous vehicle is substantially the same as the respective maximum speed of the assistant autonomous vehicle and is a lower speed than the respective maximum speed of the given autonomous vehicle; and
   determining that the front autonomous vehicle and the assistant autonomous vehicle are blocking the lane in which the given autonomous vehicle and the front autonomous vehicle are traveling and the lane adjacent to the lane in which the given autonomous vehicle and the front autonomous vehicle are traveling, respectively, and preventing the given autonomous vehicle from traveling at the given autonomous vehicle's respective maximum speed.

4. The method of claim 2, wherein the method further comprises:

storing, by each of the plurality of autonomous vehicles, the respective vehicle information obtained from the one or more other autonomous vehicles within communication range; and the respective vehicle information further includes, for each of the other autonomous vehicles, one or more of:
- a vehicle identifier for the other autonomous vehicle;
- a maximal acceleration of the other autonomous vehicle;
- a maximal deceleration of the other autonomous vehicle;
- a driving status indicating whether the other autonomous vehicle is in a maximum state in which the other autonomous vehicle is traveling at the other autonomous vehicle's respective maximum speed, is in a deadlock condition, or is in a freerun state in which the other autonomous vehicle is neither traveling at the other autonomous vehicle's respective maximum speed nor in a deadlock condition; and
- a group coordination status indicating whether or not the other autonomous vehicle is currently a member of a coordination group.

5. The method of claim 1, further comprising subsequent to sending the cooperative driving task request to initiate actions by the two or more autonomous vehicles in the coordination group to resolve the deadlock condition:
- monitoring, by the given autonomous vehicle, respective vehicle information broadcast periodically by the autonomous vehicles in the coordination group using vehicle-to-vehicle communication;
- determining, dependent on the respective vehicle information broadcast periodically by the autonomous vehicles in the coordination group, that the deadlock condition is resolved; and
- initiating, by the given autonomous vehicle in response to determining that the deadlock condition is resolved, release of the coordination group.

6. The method of claim 1, wherein the method further comprises, for each of the autonomous vehicles prior to automatically detecting that the given autonomous vehicle is in the deadlock condition:
- receiving input specifying the respective driving plan for the autonomous vehicle; and
- receiving input specifying the respective maximum speed for the autonomous vehicle;
- the cooperative driving request initiates actions by the two or more autonomous vehicles in the coordination group to resolve the deadlock condition including one or more of:
  - modifying the respective driving plan of an autonomous vehicle in the coordination group to include a behavior coordination action; and
  - initiating a speed negotiation with an autonomous vehicle in the coordination group.

7. The method of claim 1, wherein the cooperative driving task request is sent to the front autonomous vehicle and instructs the front autonomous vehicle to change lanes into the adjacent lane in which the assistant autonomous vehicle is traveling and the method further comprises:
- modifying, by the front autonomous vehicle, the respective driving plan of the front autonomous vehicle to include a priority task to change lanes into the adjacent lane in which the assistant autonomous vehicle is traveling.

8. The method of claim 7, further comprising:
- sending, by the front autonomous vehicle to the assistant autonomous vehicle using vehicle-to-vehicle communication, a cooperative driving task request instructing the assistant autonomous vehicle to reduce the assistant autonomous vehicle's speed by an amount sufficient to make space in the adjacent lane for the front autonomous vehicle to change lanes.

9. The method of claim 8, further comprising:
- obtaining, by the front autonomous vehicle using vehicle-to-vehicle communication, vehicle information from an autonomous vehicle in front of the assistant autonomous vehicle in the adjacent lane;
- determining, based on the vehicle information obtained from the autonomous vehicle in front of the assistant autonomous vehicle in the adjacent lane that the autonomous vehicle in front of the assistant autonomous vehicle is traveling at substantially the same speed as the respective maximum speed of the front autonomous vehicle; and
- reducing, by the front autonomous vehicle, the speed of the front autonomous vehicle by an amount that is greater than the amount by which the speed of the assistant autonomous vehicle is requested to reduce the assistant autonomous vehicle's speed.

10. The method of claim 1, wherein initiating formation of the coordination group comprises:
- changing, by the given autonomous vehicle, a coordination group status for the given autonomous vehicle from free to busy;
- sending, by the given autonomous vehicle to the front autonomous vehicle using vehicle-to-vehicle communication, a coordination request;
- receiving, by the given autonomous vehicle from the front autonomous vehicle using vehicle-to-vehicle communication, a coordination confirmation;
- changing, by the front autonomous vehicle, a coordination group status for the front autonomous vehicle from free to busy;
- sending, by the front autonomous vehicle to the assistant autonomous vehicle using vehicle-to-vehicle communication, an assistance request;
- receiving, by the front autonomous vehicle from the assistant autonomous vehicle using vehicle-to-vehicle communication, an assistance confirmation; and
- changing, by the assistant autonomous vehicle, a coordination group status for the assistant autonomous vehicle from free to busy.

11. A system for traffic congestion avoidance using cooperative autonomous driving, comprising:
- a plurality of autonomous vehicles each executing a respective driving plan and being associated with a respective maximum speed representing a predetermined upper bound on a speed at which the autonomous vehicle is to travel, each autonomous vehicle comprising:
  - a processor; and
  - memory media storing program instructions that when executed by the processor cause the processor to implement a cooperative driving strategy including, for a given one of the plurality of autonomous vehicles:
    - automatically detecting that the given autonomous vehicle is in a deadlock condition in which the given autonomous vehicle is blocked from reaching the given autonomous vehicle's respective maximum speed by autonomous vehicles in two or more lanes;
    - initiating formation of a coordination group comprising three of the plurality of autonomous vehicles, the three autonomous vehicles including the given autonomous vehicle, a front autonomous vehicle traveling in front of and in a same driving lane as the given autonomous vehicle, and an assistant autonomous vehicle traveling in a lane adjacent to the lane in which the given autonomous vehicle and the front autonomous vehicle are traveling; and transmitting a cooperative driving task request using vehicle-to-vehicle communication to initiate actions by the front autonomous vehicle and the assistant autonomous vehicle in the coordination group to resolve the deadlock condition.

12. The system of claim 11, wherein each of the plurality of autonomous vehicles further comprises a respective wireless vehicle-to-vehicle communication system, and automatically detecting that the given autonomous vehicle is in the deadlock condition comprises:
obtaining, by each of the plurality of autonomous vehicles using the respective wireless vehicle-to-vehicle communication system, respective vehicle information from one or more other autonomous vehicles within communication range of the autonomous vehicle including, for each of the other autonomous vehicles:
a current speed of the other autonomous vehicle;
the respective maximum speed of the other autonomous vehicle;
a direction in which the other autonomous vehicle is traveling; and
a current position of the other autonomous vehicle;
determining, dependent on the respective vehicle information obtained from the one or more other autonomous vehicles, that the given autonomous vehicle is in the deadlock condition.

13. The system of claim 12, wherein determining, dependent on the respective vehicle information obtained from the one or more other autonomous vehicles, that the given autonomous vehicle is in the deadlock condition comprises:
determining that the front autonomous vehicle is traveling at the front autonomous vehicle's respective maximum speed;
determining that the assistant autonomous vehicle is traveling at the assistant autonomous vehicle's respective maximum speed;
determining that the respective maximum speed of the front autonomous vehicle is substantially the same as the respective maximum speed of the assistant autonomous vehicle and is a lower speed than the respective maximum speed of the given autonomous vehicle; and
determining that the front autonomous vehicle and the assistant autonomous vehicle are blocking the lane in which the given autonomous vehicle and the front autonomous vehicle are traveling and the lane adjacent to the lane in which the given autonomous vehicle and the front autonomous vehicle are traveling, respectively, and preventing the given autonomous vehicle from traveling at the given autonomous vehicle's respective maximum speed.

14. The system of claim 12, wherein the memory media of each of the plurality of autonomous vehicles further store the respective vehicle information obtained from the one or more other autonomous vehicles within communication range of the autonomous vehicle, and
the respective vehicle information obtained from each of the other autonomous vehicles further includes one or more of:
a vehicle identifier for the other autonomous vehicle;
a maximal acceleration of the other autonomous vehicle;
a maximal deceleration of the other autonomous vehicle;
a driving status indicating whether the other autonomous vehicle is in a maximum state in which the other autonomous vehicle is traveling at the other autonomous vehicle's respective maximum speed, is in a deadlock condition, or is in a freerun state in which the other autonomous vehicle is neither traveling at the other autonomous vehicle's respective maximum speed nor in a deadlock condition; and
a group coordination status indicating whether or not the other autonomous vehicle is currently a member of a coordination group.

15. The system of claim 11, wherein each of the plurality of autonomous vehicles further comprises a wireless vehicle-to-vehicle communication system, and
the cooperative driving strategy further includes, subsequent to initiating the actions by the front autonomous vehicle and the assistant autonomous vehicle in the coordination group to resolve the deadlock condition:
monitoring, by the given autonomous vehicle, respective vehicle information broadcast periodically by the autonomous vehicles in the coordination group using the respective wireless vehicle-to-vehicle communication systems;
determining, dependent on the respective vehicle information broadcast periodically by the autonomous vehicles in the coordination group, that the deadlock condition is resolved; and
initiating, by the given autonomous vehicle in response to determining that the deadlock condition is resolved, release of the coordination group.

16. The system of claim 11, wherein the cooperative driving strategy further includes, for each of the autonomous vehicles prior to automatically detecting that the given autonomous vehicle is in the deadlock condition:
receiving input specifying the respective driving plan for the autonomous vehicle; and
receiving input specifying the respective maximum speed for the autonomous vehicle; and
the cooperative driving request initiates actions by the front autonomous vehicle and the assistant autonomous vehicle in the coordination group to resolve the deadlock condition including one or more of:
modifying the respective driving plan of an autonomous vehicle in the coordination group to include a behavior coordination action; and
initiating a speed negotiation with an autonomous vehicle in the coordination group.

17. The system of claim 11, wherein the cooperative driving task request is transmitted to the front autonomous vehicle and instructs the front autonomous vehicle to change lanes into the adjacent lane in which the assistant autonomous vehicle is traveling, and
the cooperative driving strategy further includes, for the front autonomous vehicle:
modifying the respective driving plan of the front autonomous vehicle to include a priority task to change lanes into the adjacent lane in which the assistant autonomous vehicle is traveling.

18. The system of claim 17, wherein the cooperative driving strategy further includes, for the front autonomous vehicle, transmitting to the assistant autonomous vehicle using vehicle-to-vehicle communication, a cooperative driving task request instructing the assistant autonomous vehicle to reduce the assistant autonomous vehicle's speed by an amount sufficient to make space in the adjacent lane for the front autonomous vehicle to change lanes.

19. The system of claim 18, wherein the cooperative driving strategy further includes, for the front autonomous vehicle:
   obtaining, using vehicle-to-vehicle communication, vehicle information from an autonomous vehicle in front of the assistant autonomous vehicle in the adjacent lane;
   determining, based on the vehicle information obtained from the autonomous vehicle in front of the assistant autonomous vehicle in the adjacent lane that the autonomous vehicle in front of the assistant autonomous vehicle is traveling at substantially the same speed as the respective maximum speed of the front autonomous vehicle; and
   reducing the speed of the front autonomous vehicle by an amount that is greater than the amount by which the speed of the assistant autonomous vehicle is requested to reduce the assistant autonomous vehicle's speed.

20. The system of claim 11, wherein each of the plurality of autonomous vehicles further comprises a respective wireless vehicle-to-vehicle communication system, and
   initiating formation of the coordination group comprises:
      changing a coordination group status for the given autonomous vehicle from free to busy;
      transmitting, to the front autonomous vehicle using the wireless vehicle-to-vehicle communication system of the given autonomous vehicle, a coordination request;
      receiving, from the front autonomous vehicle using the wireless vehicle-to-vehicle communication system of the given autonomous vehicle, a coordination confirmation;
   the cooperative driving strategy further includes, for the front autonomous vehicle:
      receiving, from the given autonomous vehicle using the wireless vehicle-to-vehicle communication system of the front autonomous vehicle, the coordination request;
      changing a coordination group status for the front autonomous vehicle from free to busy;
      transmitting, to the given autonomous vehicle using the wireless vehicle-to-vehicle communication system of the front autonomous vehicle, the coordination confirmation;
      transmitting, to the assistant autonomous vehicle using the wireless vehicle-to-vehicle communication system of the front autonomous vehicle, an assistance request; and
      receiving, from the assistant autonomous vehicle using the wireless vehicle-to-vehicle communication system of the front autonomous vehicle, an assistance confirmation; and
   the cooperative driving strategy further includes, for the assistant autonomous vehicle:
      receiving, from the front autonomous vehicle using the wireless vehicle-to-vehicle communication system of the assistant autonomous vehicle, the assistance request;
      changing a coordination group status for the assistant autonomous vehicle from free to busy; and
      transmitting, to the front autonomous vehicle using the wireless vehicle-to-vehicle communication system of the assistant autonomous vehicle, the assistance confirmation.

* * * * *